(12) United States Patent
Fullerton et al.

(10) Patent No.: US 7,256,727 B2
(45) Date of Patent: Aug. 14, 2007

(54) SYSTEM AND METHOD FOR RADIATING RF WAVEFORMS USING DISCONTINUES ASSOCIATED WITH A UTILITY TRANSMISSION LINE

(75) Inventors: Larry W. Fullerton, Brownsboro, AL (US); Mark D. Roberts, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 98 days.

(21) Appl. No.: 11/030,310

(22) Filed: Jan. 7, 2005

(65) Prior Publication Data

US 2006/0152404 A1    Jul. 13, 2006

(51) Int. Cl.
*G01S 13/62* (2006.01)
(52) U.S. Cl. .............................. 342/28; 342/52; 342/27
(58) Field of Classification Search .................. 342/27, 342/28, 52
See application file for complete search history.

(56) References Cited

U.S. PATENT DOCUMENTS

| | | | |
|---|---|---|---|
| 5,446,446 A * | 8/1995 | Harman | 350/566 |
| 5,448,222 A * | 9/1995 | Harman | 340/566 |
| 5,661,490 A | 8/1997 | McEwan | |
| 5,677,927 A | 10/1997 | Fullerton et al. | |
| 6,218,979 B1 * | 4/2001 | Barnes et al. | 342/28 |
| 6,782,048 B2 | 8/2004 | Santhoff | |
| 6,909,669 B1 * | 6/2005 | Yankielun et al. | 367/131 |
| 7,129,886 B2 * | 10/2006 | Hall et al. | 342/28 |
| 2004/0204112 A1 * | 10/2004 | Caci | 455/562.1 |
| 2005/0194978 A1 * | 9/2005 | Smith | 324/527 |
| 2005/0212526 A1 * | 9/2005 | Blades | 324/543 |
| 2006/0125609 A1 * | 6/2006 | Kline et al. | 340/310.17 |
| 2006/0152404 A1 * | 7/2006 | Fullerton et al. | 342/28 |
| 2006/0164998 A1 * | 7/2006 | Pharn | 370/241 |
| 2006/0181283 A1 * | 8/2006 | Wajcer et al. | 324/539 |
| 2007/0024487 A1 * | 2/2007 | Zemany et al. | 342/22 |
| 2007/0024488 A1 * | 2/2007 | Zemany et al. | 342/22 |

* cited by examiner

*Primary Examiner*—John B. Sotomayor
(74) *Attorney, Agent, or Firm*—Venable LLP; Robert Babayi

(57) ABSTRACT

A method for processing radio frequency reflections is provided. The method applies an RF waveform to a transmission line that is a conductor used for providing a utility service. The method uses a RF waveform generator to transmit UltraWideband (UWB) RF waveforms through the conductors of a building. The RF waveforms are emitted at emission points that can be impedance discontinuities along the transmission line or impulse radios. The emitted RF waveforms reflect off of objects in the building and are received at reception points that can be impedance discontinuities or impulse radios. These reflections are processed to determine movement of objects within or near the building. Based on the reflections of the RF waveforms, the position of the objects within or near the building can be determined.

36 Claims, 22 Drawing Sheets

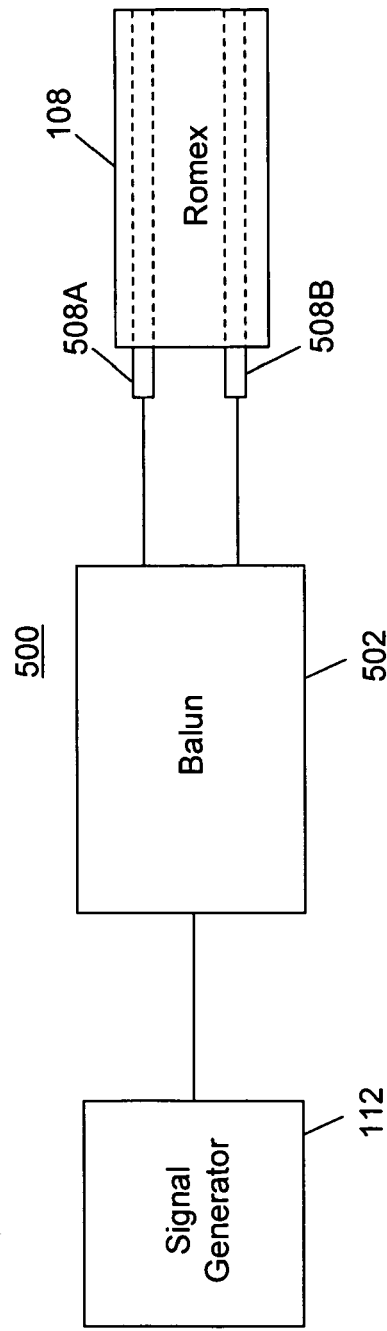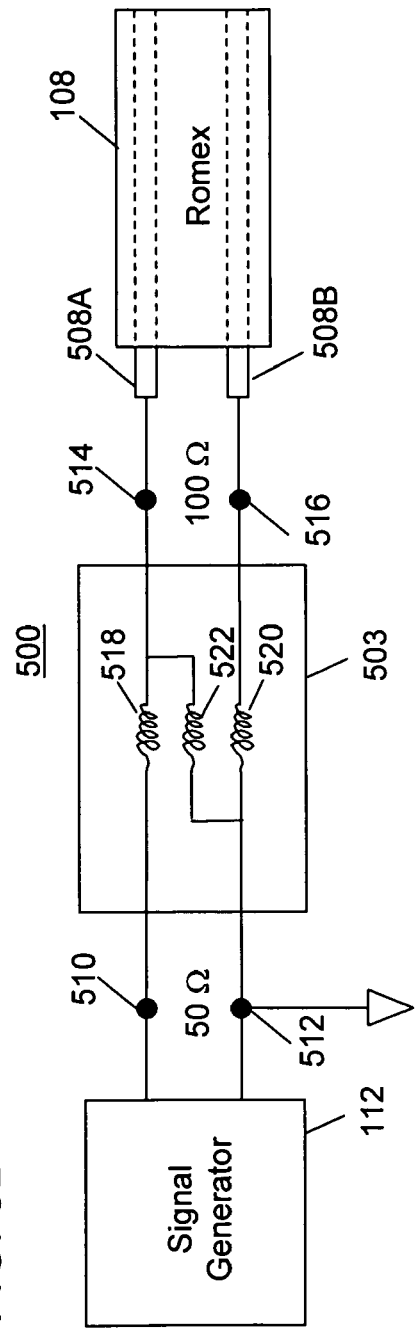
FIG. 5A
FIG. 5B

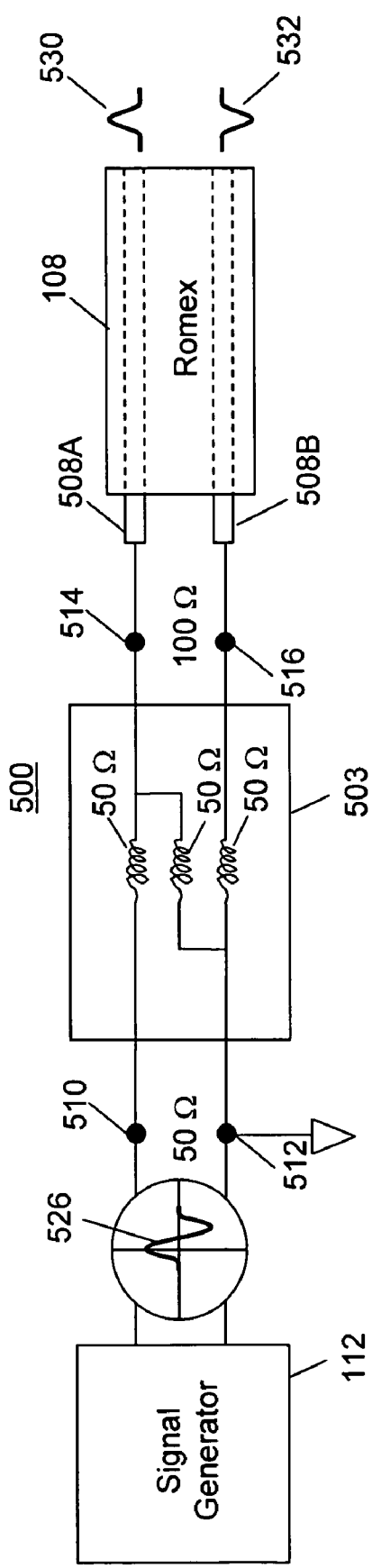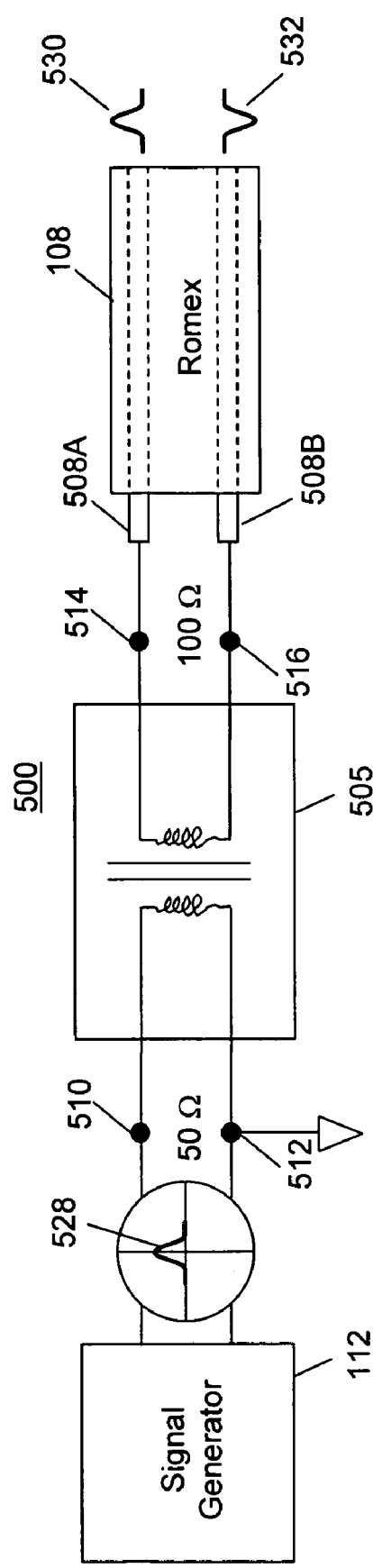

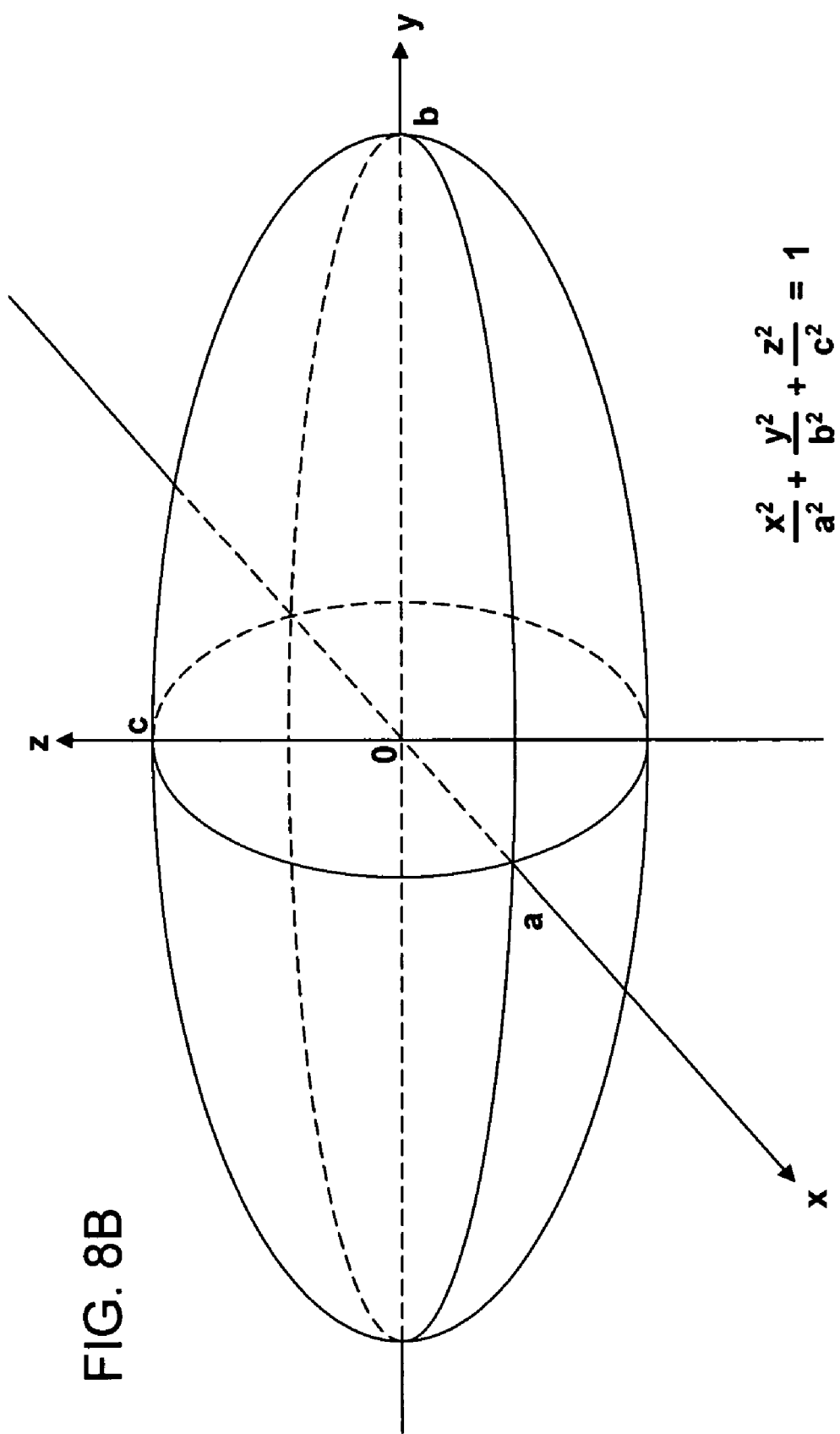

SYSTEM AND METHOD FOR RADIATING RF WAVEFORMS USING DISCONTINUES ASSOCIATED WITH A UTILITY TRANSMISSION LINE

The US Government has a paid-up license in this invention and the right in limited circumstances to require the patent owner to license others on reasonable terms as provided for by the terms of contract MDA972-03-0074 awarded by the Defense Advanced Research Projects Agency, Arlington, Va.

BACKGROUND OF THE INVENTION

Radar is a device or system consisting of an emitter that emits waves (RF, acoustic, etc.) that reflect off objects and a receiver that receives the reflections of the emitted waves for processing to detect, track or locate the objects. Various radar systems are known for detecting presence of objects, persons, things, etc. In one application, a security radar system detects unauthorized intrusions into a protected area. Such security systems operate based on activation of an intrusion sensing device, such as an acoustic motion detector, to generate an alert or alarm when an unauthorized intrusion is detected, for example, by placing a call to a remote police station. Systems that detect presence of objects have also been used to provide information related to the number and position of objects, things or persons within enclosed structures. Such systems have also been used to find survivors within the rubble of collapsed buildings.

The so-called "first time responders," such as law enforcement officers and fire fighters, etc., have also used such detection systems for surveillance and for providing situational awareness for risk reduction or decreasing unknowns. The acoustic solution for detecting presence of an object, for example, uses a very sensitive listening device (i.e. microphone), or array of them, to process incoming noise. The disadvantage of acoustical systems lies in the fact that without an array of directional listening devices, it is almost impossible to determine the location of the targets that generate noise. Furthermore, moving targets may not make enough noise to be detected. On the other hand, the optical solution has been used to view the interior of the structure through a window, or to find a crack in the structure through which to view the interior, or actually drill a hole so that a camera could be inserted for surveillance. The drawbacks of this solution are that it takes time to find a crack or drill a hole and it is noisy to do so. Thus, in a hostage or raid situation, the law enforcement personnel could lose the tactical advantage of surprise. Additionally, the view through a window or crack may only provide a limited field of view, and so, parts of the room may be hidden. Moreover, if the room is smoke filled then this solution is ineffective. Finally, the IR solution is an optical solution that cannot be implemented without a direct view.

Radar systems are also known for detecting presence of objects. Serious developmental work on radar began in the 1930s, but the basic idea of radar had its origins in the classical experiments on electromagnetic emission conducted by the German physicist Heinrich Hertz during the late 1880s. As is well known, radars emit electromagnetic waves (also known as radar radio signals) and detect presence of an object by processing reflections off the object at a receiver. Known radar radio signals cover a wide frequency spectrum, ranging from narrow band to ultra-wideband (UWB) radar signals. UWB radar signals exhibit many desirable features that would be advantageous in various environments. These features include high range resolution, low processing sidelobes, excellent clutter rejection capability, and the ability to scan distinct range windows. Additionally, the technique of time modulated UWB (TM-UWB) adds decreased range ambiguities and increased resistance to spoofing or interference. UWB radar can operate on wavelengths capable of penetrating typical non-metallic construction material. These advantages make UWB radar particularly beneficial in short range, high clutter environments.

Various types of UWB radars are known. For example, a mono-static radar transmits radar signals from one location and receives reflections at the same location, whereas a bi-static radar transmits radar signals at one location and receives the reflections at another location. One such radar system is known as RadarVision®, which is developed and manufactured by Time Domain Corporation, the assignee of the present invention. First time responders, SWAT team members, and others use the RadarVision® to "see through walls" to determine the number and position of moving objects, persons, or things on the other side of the wall to support tactical decision-making.

UWB radars have beneficial applicability in environments where vision is obscured by obstacles such as walls, rubble, or smoke, and fire. Various embodiments of UWB radar have been described in co-owned U.S. Pat. No. 4,743,906, issued to Fullerton, May 10, 1988; U.S. Pat. No. 4,813,057, issued to Fullerton, Mar. 14, 1989; and U.S. Pat. No. 5,363,108, issued to Fullerton, Nov. 8, 1994, all of which are incorporated herein by reference. Moreover, arrays of such radars have been developed for such uses as high resolution detection and intruder alert systems, as described in co-owned U.S. Pat. No. 6,218,979 B1, issued to Barnes, et al. Apr. 17, 2001; and U.S. Pat. No. 6,177,903, issued to Fullerton, et al Jan. 23, 2001, respectively, both of which are incorporated herein by reference. An alternative 'scanning receiver' approach to UWB radar is described in U.S. Pat. No. 6,614,384, issued to Hall, et al. Sep. 2, 2003, which is also incorporated herein by reference. These systems benefit from being low power and non-interfering, and yet are capable of scanning through typical, non-metallic building material.

With the increased need for sophisticated surveillance in view of security threats facing the world as well as the increased need for meeting challenges associated with public safety, emergency and disaster situations, there still remains an ongoing need for simple and effective systems and methods for detecting the presence of objects, things or persons under a wide variety of circumstances.

SUMMARY OF THE INVENTION

Briefly, according to the present invention, a system and method for radiating radio frequency (RF) waveforms generates an RF waveform resulting in emissions from one or more emission points. The generated RF waveform, which can be coupled to the utility transmission line using a Balun, a transformer, or a coupler, comprise any suitable RF waveform, including a UWB waveform such as a Gaussian pulse waveform, a pulse doublet waveform, a pulse triplet waveform, a pulse quadlet waveform, or a burst of cycles waveform. One or more RF reflections of the emitted RF waveform are received at one or more reception points. At least one of the one or more emission points and the one or more reception points comprises an impedance discontinuity coupled to a utility transmission line that provides a public or private utility service. In one exemplary embodiment, the utility transmission line can be an electrical wiring, such as Romex®, a telephone wiring, a cable wiring, audio/visual wiring, a local area network (LAN) wiring, a private branch exchange (PBX) wiring, a girder, a piping, and a metal duct work, and the impedance discontinuity can be any one of an outlet, a switch, a light bulb, a light fixture, a lamp, a ceiling light, a motor, a control system, and a resistance heating. By processing temporal and non-temporal characteristics of the one or more RF reflections, the present invention can support various radar applications, including locating an object or target, determining the speed of a target, tracking the motion of a target, detecting an intrusion, and detecting the presence of a target.

According to some of the more detailed features of the invention, the processing involves determining various parameters. The temporal and the non-temporal characteristic of the one or more RF reflections are determined at a first time and a second time and compared to each other, for example, to detect intrusion. Moreover, angles of arrival of the one or more RF reflections and the location of the one or more impedance discontinuities are determined for various positioning applications. For supporting the radar applications in accordance with the present invention, the one or more emission points and the one or more reception points are used to form various combinations of bistatic radar and monostatic radar arrangements. Additionally, emission time for when the RF waveform is emitted from the emission point can be determined using Time Domain Reflectometry (TDR) techniques. Further, the reception times for when the one or more RF reflections are received at the one or more reception points is also determined.

According to some of the other more detailed aspects of the invention, the RF waveform can be generated by various means including an RF waveform generator coupled to the utility transmission line and a radio transmitter that is distal to the utility transmission line. Also, the one or more RF reflections can be received by various types of receivers, including a radio receiver that is distal to the utility transmission line or a TDR receiver that is coupled to the utility transmission line.

A system and method for profiling radio frequency reflections from surrounding objects comprises 1) emitting one or more RF waveforms at one or more impedance discontinuities coupled to a transmission line that includes a conductor used for providing a utility service within an environment, 2) receiving one or more RF reflections of the emitted one or more RF waveforms and 3) processing the received one or more RF reflections to provide a radio frequency profile for the environment. Based on one or more radio frequency profiles, the present invention can be used to detect presence of an object, detect intrusion, determine position of an object, track objects, or locate objections within the environment.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 5A illustrates a single ended Balun for attaching the RF waveform generator 112 of the present invention to a utility service of the present invention; FIG. 5B illustrates using a transformer to match the impedance between the RF waveform generator 112 and the transmission line wiring 108 within a building; FIG. 5C illustrates transmitting a balanced current across the transformer according to an embodiment of the present invention; FIG. 5D illustrates a further embodiment of the impedance matching between the RF waveform generator 112 and the transmission line wiring 108 within a building.

FIG. 8B shows an ellipsoid in a x-y-z Cartesian coordinate system;

DETAILED DESCRIPTION OF THE INVENTION

Figure 1:
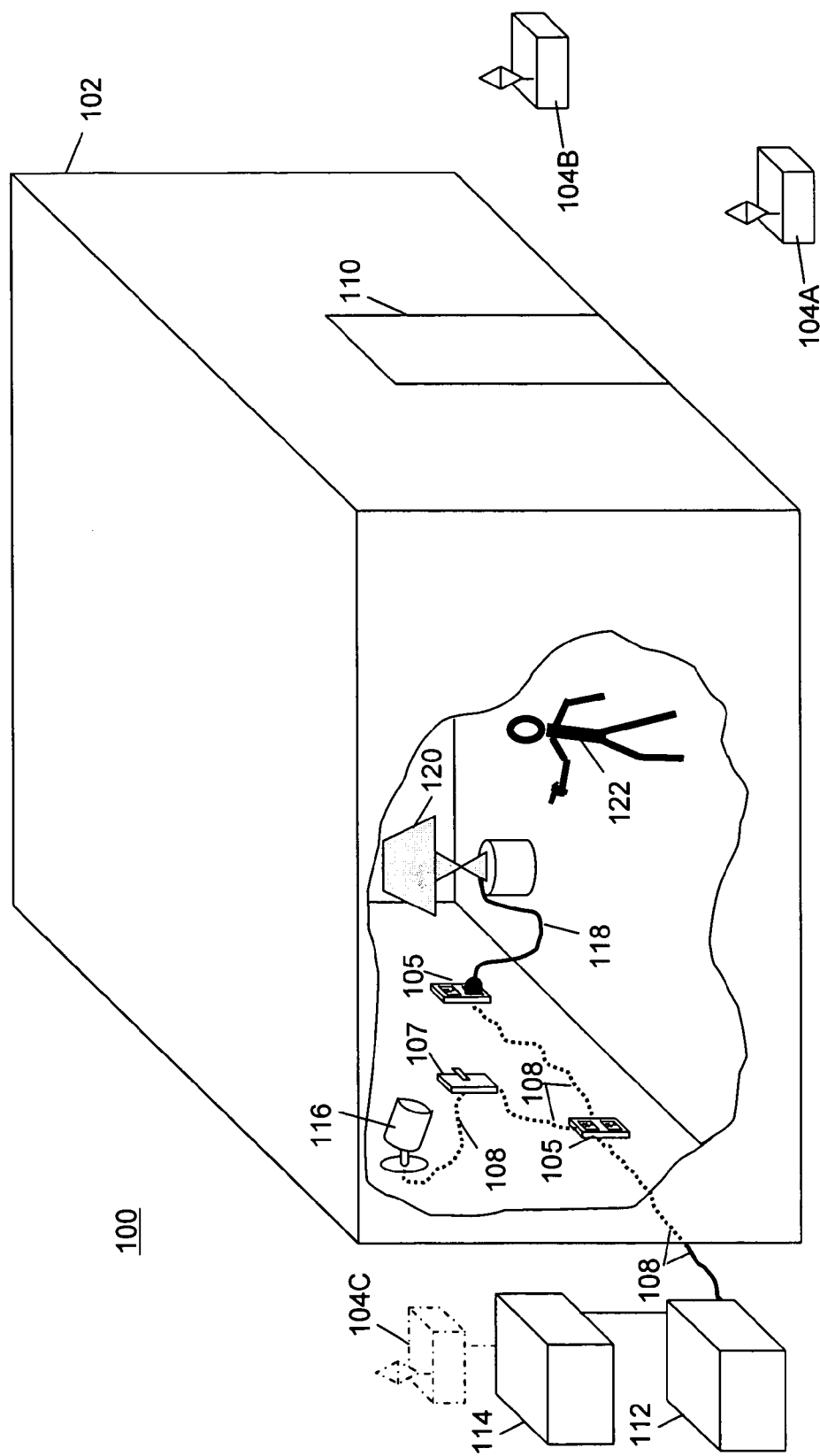
FIG. 1 illustrates a three dimensional (3D) view of a building incorporating the object detection system according to one embodiment of the present invention.

The present invention processes emitted RF waveforms, such as UWB waveforms, and their received reflections for radar applications, where the emission, reception or both are via an impedance discontinuity, which is coupled to a transmission line that provides a public or private utility service. Such transmission line could be in service to provide electric utility, telephone, cable, LAN, audio/video, etc. The radar applications used with the present invention include profiling waveform reflections in an environment, detecting presence or location of objects, tracking motion of targets, detecting intrusion, etc., as described fully below.

Because the exemplary embodiment of the invention uses UWB waveform and impulse technology, the following provides an overview of relevant aspects of such communications theory to assist the reader with full understanding of the present invention. It should be noted that while, the exemplary embodiment is described based on impulse radio and UWB waveforms, the present invention can be implemented with any suitable radar technology or radio frequency signaling technique, including those that use signals that occupy narrower bands of the frequency spectrum.

The terminology "impulse radio" is used primarily for historical convenience and the terminology can be generally interchanged with the terminology 'impulse communications system, ultra-wideband system, or ultra-wideband communication systems.' Furthermore the described impulse radio technology is generally applicable to various other impulse system applications including but not limited to UWB radar systems and impulse positioning systems. Accordingly, the terminology 'impulse radio' can be generally interchanged with the terminology 'impulse transmission system' and 'impulse reception system.'

Impulse radio refers to a radio system based on short, low duty-cycle pulse bursts. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Various types of modulation can be used to communicate information within the system of the present invention including amplitude modulation, phase modulation, frequency modulation, time-shift modulation (also referred to as pulse-position modulation) and M-ary versions of these. Link channelization may be provided by pulse trains having constant or coded pulse spacing.

As is well known, impulse systems can measure distances to relatively fine resolution because an impulse radio waveform has no multi-cycle ambiguity. Thus, it is possible to determine waveform position to less than a wavelength, potentially down to the noise floor of the system. This time position measurement can be used to measure propagation delay to determine link distance to a high degree of precision. For example, 30 ps of time transfer resolution correspond to resolving distance down to nearly a centimeter. Exemplary positioning techniques used in the present invention are described in U.S. Pat. No. 6,133,876, and U.S. Pat. No. 6,111,536, both of which are incorporated by reference.

FIG. 1 illustrates a three dimensional (3D) view of an exemplary environment 100 that is used to describe the way in which the present invention processes RF waveform reflections for radar applications. Broadly, a radar application under the present invention is a method or system that processes received reflections of emitted RF waveforms using one or more impedance discontinuities that are coupled to a utility transmission line. Generally, the RF waveforms are emitted from one or more emission points and the reflections are received at one or more reception points. As further described below, the one or more impedance discontinuities that are coupled to a utility transmission line can act as emission points, reception points, or both.

FIG. 1 depicts a cutaway allowing one to view inside the building 102. The building 102 includes various types of utility transmission lines 108 that are used to provide a public or private type of utility. For example, the building 102 may contain girders, metal duct work, piping, electrical wiring, and other RF conductive materials that comprise utility transmission lines in accordance with the present invention. Examples of transmission lines in a public utility service include electrical wiring, telephone wiring, cable wiring, etc. Examples of transmission lines in a private utility service include audio/visual wiring, local area network (LAN) wiring, private branch exchange (PBX) wiring, and other RF conductive materials including girders, piping, metal duct work, etc. The present invention applies to any type of environment, such as any arbitrarily shaped building, with any configuration of doors, windows, interior walls, wiring, piping, etc.

Utility transmission lines comprise a conductive portion along which an applied RF waves propagates. Utility service transmission lines also include one or more impedance discontinuities along their path that causes emission of at least a portion of the applied RF waveform, when the waveform encounters a discontinuity. At the discontinuity, part of the RF waveform is emitted, and part of the RF waveform is reflected back from which it came. As such any discontinuity along a utility transmission line comprises an emission point for radiating applied RF waveforms. As described later, discontinuities along the utility transmission line can also be used as reception points.

As shown in FIG. 1, a utility transmission line 108, comprising the electrical wiring of the building 102, connects to electrical outlets 105, switch 107, and light fixture 116 for providing electrical power utility to the building 102. The utility transmission line 108 also provided electrical power to a lamp 120, which is plugged into an outlet 105 via an electrical cord 118. According to this exemplary embodiment, the electrical wiring functions as the utility transmission line 108, and the electrical outlets 105, switch 107, light fixture 116, and lamp 120 are all examples of discontinuities along the utility transmission line. Other examples of discontinuities include ceiling lights, motors, control systems, and resistance heating. Still another example comprises transformers that are used for electrical power distribution along power lines. Consequently, an applied RF waveform, for example, a Gaussian pulse generated by the RF waveform generator 112, as described below, would propagate along the utility transmission line 108 and be emitted at emission points defined by any encountered discontinuities, such as the outlets 105, switch 107, lamp 120, and fixture 116.

Exemplary utility transmission lines used for radiating RF waveforms according to the present invention include efficient conductors for frequencies above 300 MHz. Preferably, the conductors exhibit minimal distortion for dispersion or frequency dependence notching. Electrical wiring, such as Romex® wire of appropriate gauge, e.g., 14, which is commonly used in many structures, is one suitable choice, among others, for use as utility transmission line. It should be noted that Romex® wire as described herein is an example only, and any other type of suitable utility transmission line wire may be adapted for use with the present invention.

The embodiment of FIG. 1 includes an RF waveform generator 112 that generates an RF waveform, such as a UWB radar signal, that is emitted from an emission point as described later in detail. The generated RF waveform is applied to the utility transmission line 108. The RF waveform generator 112 could be coupled to the utility transmission line 108 in various ways such as plugging directly into an outlet 105 or by splicing into the transmission line wiring 108 either inside or outside building 302, as further described in connection with FIGS. 5A–5E.

It should be noted that UWB radar signal is only one type of RF waveform that is used with the present invention. However, any other type of suitably adapted RF waveform, such as narrower band versions of UWB waveforms, can also be used. The UWB radar signal propagates down the utility transmission line 108 and emits at emission points comprising the outlets 105 and switch 107, which form discontinuities coupled to the utility transmission line. Additionally, the UWB radar signal could propagate along any extensions of the utility transmission line 108, e.g., an extension cord, and emit at a discontinuity along the extension, e.g., at lamp 120, where such discontinuity is coupled to the utility transmission line 108.

The embodiment shown in FIG. 1 also includes two impulse radio receivers 104A and 104B that are positioned at corresponding reception points within the proximity of the building 102. Emitted UWB radar signals from the emission points reflect off an exemplary target 122, for example, a person or an object, and corresponding RF reflections are received by the impulse radio receivers 104A and 104B at corresponding reception points. Thus, the impulse radio receivers 104A and 104B receive reflections that result from the emission of the generated RF waveform. Such RF waveforms are received either directly or indirectly, when the emitted RF waveforms reflect from surrounding objects or targets.

One exemplary impulse radio used in the present invention comprises a PulsON® Radio offered by Time Domain Corporation, the assignee of the present invention. As described later, the present invention is not limited to two impulse radios, and can be extended to include additional impulse radios as suited for a desired application. Although, the impulse radios 104A and 104B are described as receiving impulse radios in the embodiment of FIG. 1, in other embodiments, such impulse radios can be transmitting or a transceiver (i.e., TX and RX) radios, as further described below.

A processor 114 is used to processe information provided by the impulse radio 104A and 104B for various radar applications, including RF profiling an environment, detecting presence of an object, tracking its motion, or detecting an intrusion, etc. The processed information could relate to one or more temporal and/or non-temporal characteristics of the reflected waveforms from the target or surrounding environment (or both), e.g., time of arrival, phase, frequency, current, voltage, etc., as describe further in detail. The characteristic information, temporal or non-temporal, can be represented in various ways including in absolute or relative terms. The processor 114 can be implemented using many different configurations of computer hardware, software, digital signal processing devices, etc., as is well known to those skilled in the art. Each particular application the present invention would dictate the processing needs of the system, size requirements, memory requirements, and other implementational details. The processor 114 communicates information with the impulse radios 104A and 104B via suitable wired or wireless communication links. The communication links can be either bidirectional or simplex, depending upon the requirements of the application.

In one embodiment, an impulse radio 104C (shown in dotted line) provides a wireless communication link between the processor 114 and impulse radios 104A, 104B. In a further embodiment, the impulse radio 104C also could itself act as an additional reception point for receiving RF reflections of emitted RF waveforms. The processor 114 can also be connected to the impulse radio via wired links (e.g., coaxial cable, optical fiber). The processor 114 can be a stand-alone unit physically located at any convenient location within the system. Alternatively, it could be co-located with the impulse radio 104C or the RF waveform generator 112 and can be included within the same packaging.

Figure 2:
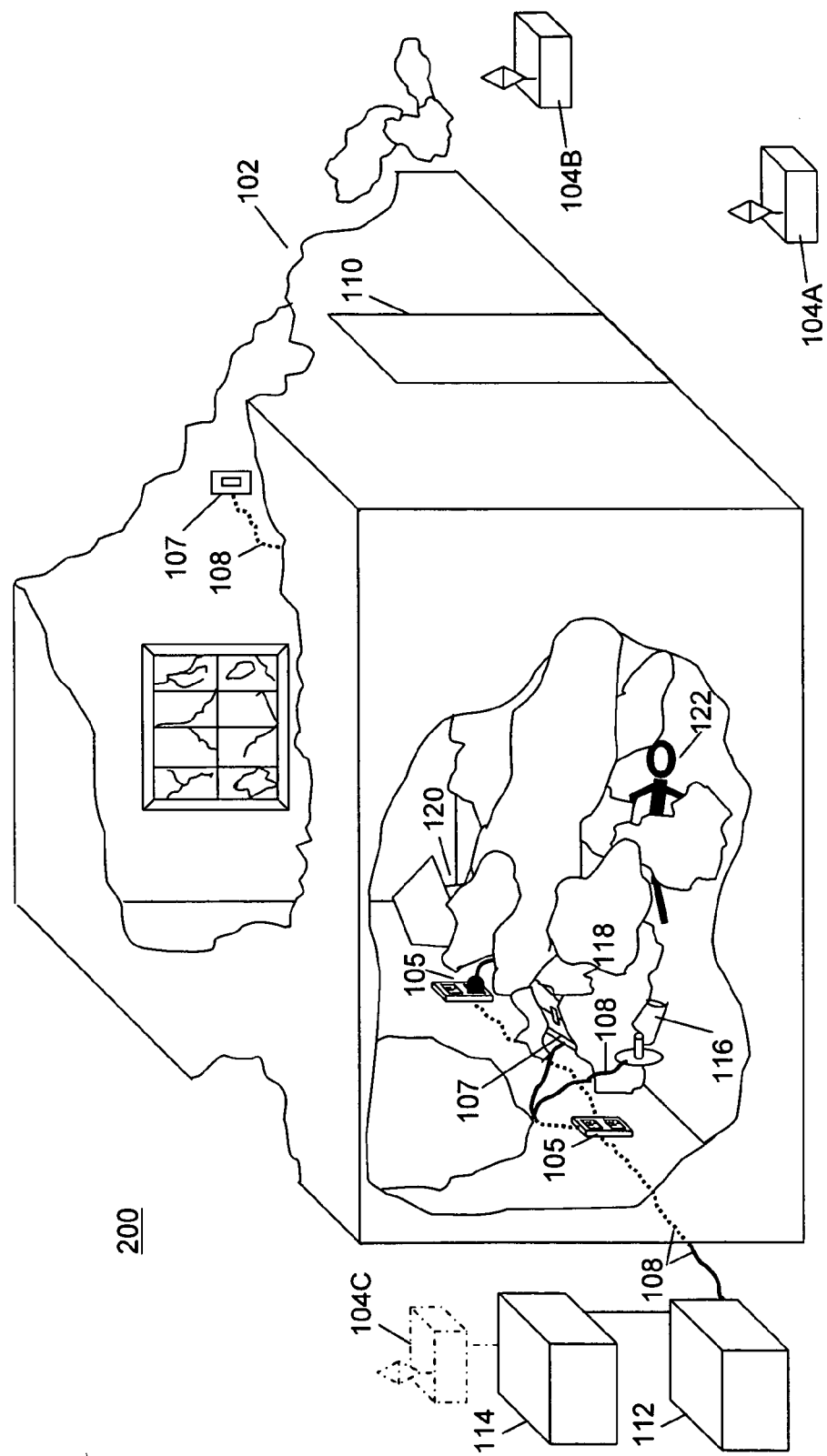
FIG. 2 illustrates a 3D view of a collapsed building incorporating the object detection system according to another embodiment of the present invention.
Figure 3:
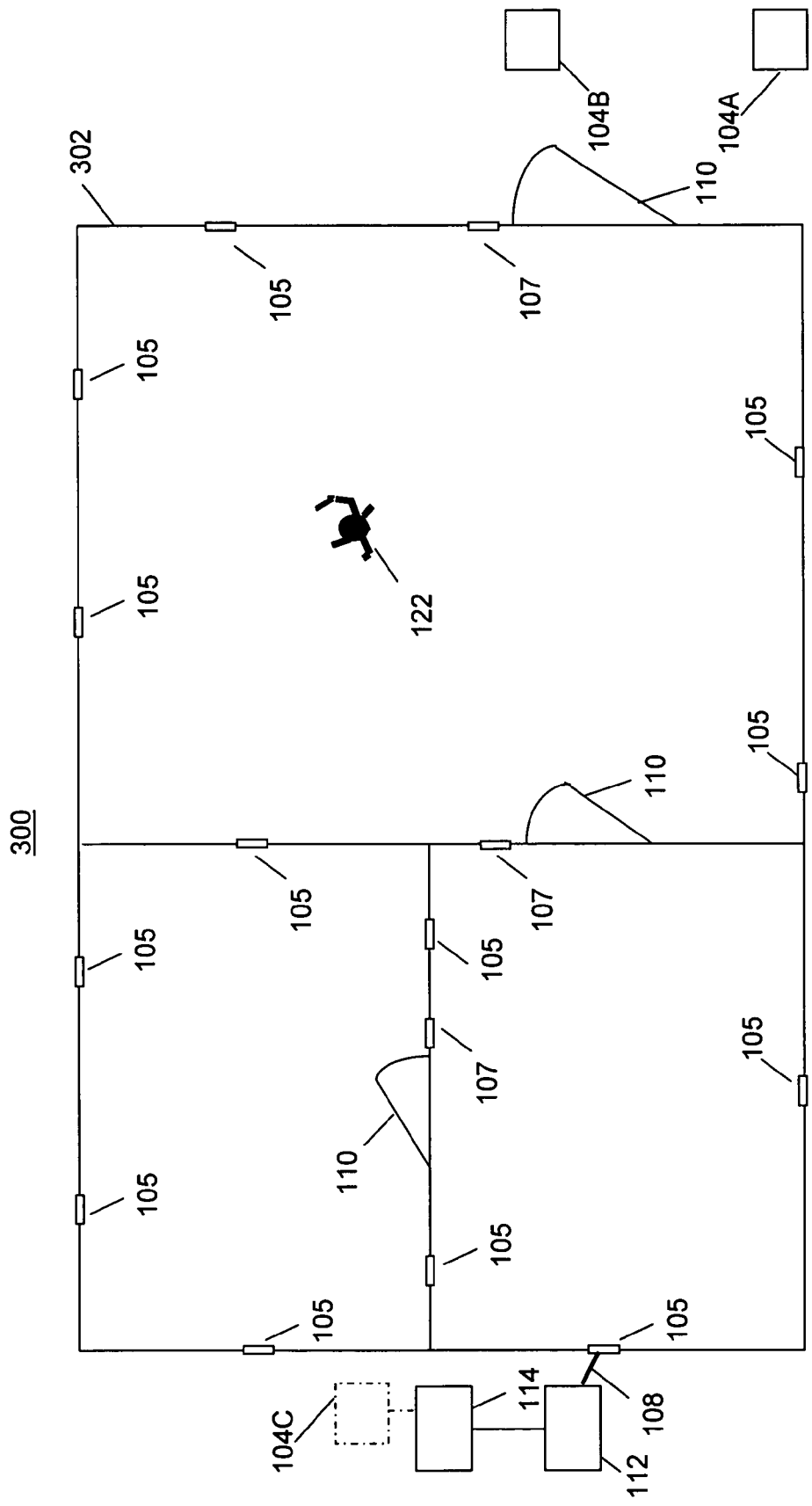
FIG. 3 illustrates a top down view of a building having utility service transmission lines using the object detection system according to one embodiment of the present invention.

According to one aspect, the present invention may be used for rescuing individuals trapped within a collapsed building. FIG. 2 illustrates a second environment 200 where building 102 has collapsed around an individual 122, the presence and/or location of whom can be detected within the rubble using any remaining utility service transmission line after the collapse. FIG. 3 illustrates a plan view of building 302 with associated outlets 105, switches 107 and utility transmission line 108, where the present invention could be used for various applications, including but not limited to, locating the target 122, tracking motion of the target 122, detecting presence of the target 122, detecting intrusion into the building 102, determining the speed of the target 122.

FIGS. 4A–4D illustrate various types of RF waveforms that could be generated by the RF waveform generator 112 in accordance with the present invention. The pulses typically comprise short, low duty-cycle pulses. Different pulse waveforms, or pulse types, may be employed to accommodate requirements of various applications. Typical pulse types include a Gaussian pulse and its first, second, and third derivatives, which are commonly known as, a pulse doublet (also referred to as a Gaussian monocycle), a pulse triplet, and a pulse quadlet. These pulse types are depicted in FIGS. 4A–4D, respectively. A pulse type may also be a wavelet set produced by combining two or more pulse waveforms (e.g. a doublet/triplet wavelet set). The system of the invention can also emit RF waveforms that have a narrower bandwidth, where the pulse waveforms comprise burst of cycles.

In one exemplary embodiment, the generated RF waveform has a center frequency between 1 GHz and 3 GHz, and a pulse repetition rate of 1.25 MHZ. The pulse repetition rate can vary based on a particular application. The generated RF waveform can comprise time-modulated pulses having a random component, where pseudo-random noise (rather than true noise) is used so that the noise sequence can be reproduced. One example of such system, which uses pseudo-random noise codes, is described in U.S. Pat. No. 5,677,927 (hereafter the '927 patent), which is hereby incorporated by reference.

FIG. 5A illustrates a coupling diagram 500 between the RF waveform generator 112 and a utility transmission line wiring 108. In one exemplary embodiment, the utility transmission line wiring 108 comprises Romex® wire. As shown, the RF waveform generator 112 is coupled to upper branch 508A and lower branch 508B of the utility transmission line 108 through a Balun 502. As is well known, a Balun (BALanced/Unbalanced) is a type of transformer connected between a balanced source or load and an unbalanced source or load. A balanced line has two conductors, with equal currents of opposite polarity. The unbalanced line has just one conductor where the current in this conductor connects to ground. In FIG. 5A, the unbalanced line is coupled to the RF waveform generator 112, while the upper branch 508A and lower branch 508B of the transmission line wiring 108 are connected to the balanced line.

FIG. 5B illustrates another embodiment for coupling the RF waveform generator 112 to the utility transmission line 108 using a transformer 503. The transformer 503 includes two input terminals 510 and 512 and two output terminals 514 and 516. The input terminals 510 and 512 are connected to the RF waveform generator 112. The output terminals 514 and 516 are connected to the upper branch 508A and lower branch 508B of the utility transmission line 108. A first inductor 518 is coupled between the first input terminal 510 and the first output terminal 514. A second inductor 520 is coupled between the second input terminal 512 and the second output terminal 514. A third inductor 522 is coupled between the second input terminal 512 and the first output terminal 516. Using the transformer 503, pulses with balanced current may be sent down the utility transmission line 108 creating a positive pulse on upper branch 508A and an equal negative pulse on lower branch 508B.

Figure 4B:
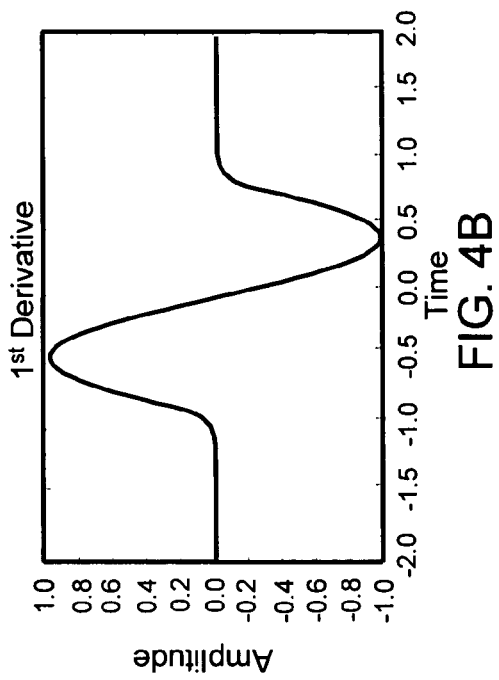
FIG. 4B illustrates the first derivative of the Gaussian pulse of FIG. 4A.
Figure 4D:
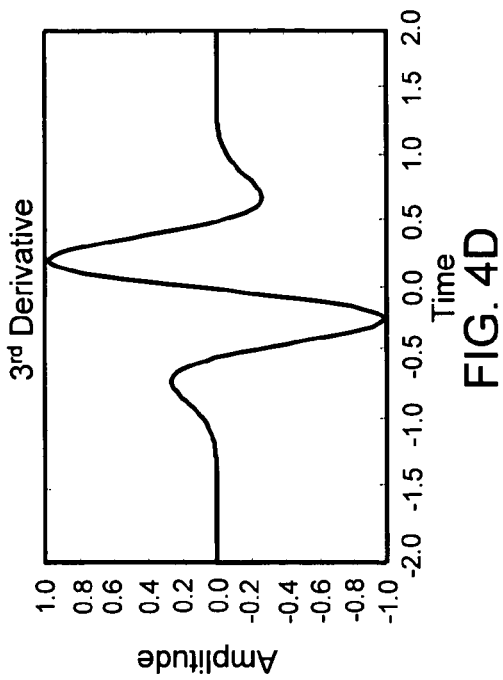
FIG. 4D illustrates the third derivative of the Gaussian pulse of FIG. 4A.
Figure 4A:
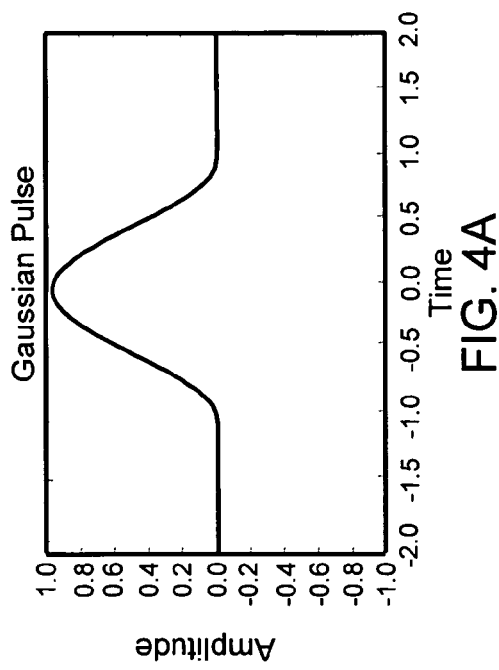
FIG. 4A illustrates a Gaussian pulse time domain representation.
Figure 4C:
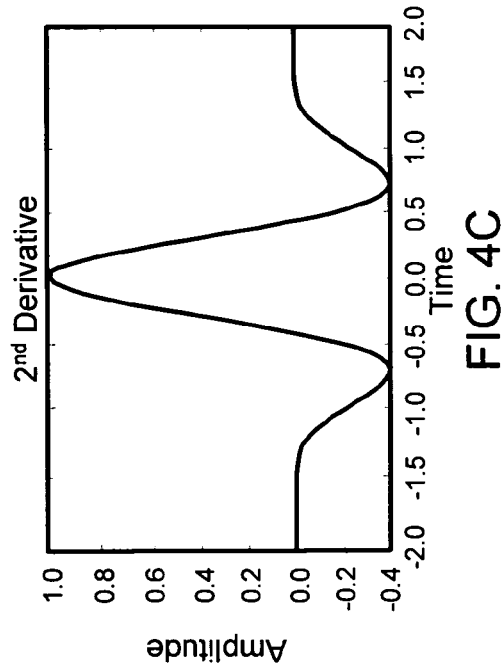
FIG. 4C illustrates the second derivative of the Gaussian pulse of FIG. 4A.

FIG. 5C illustrates the RF waveform generator 112 generating a positive and a negative RF waveform pulse on the output branches of a transformer 503. Inductors 518, 520 and 522 of the transformer 503 are all 50Ω inductors. A doublet waveform 526, as shown in FIG. 4B, is applied at the output of the RF waveform generator 112 across terminals 510 and 512 of the transformer, with output 508B coupled to ground. The doublet waveform generated from the RF waveform generator 112 causes a positive pulse 530 on the upper branch output 514 and a negative pulse 532 on the lower branch output 516 of transformer 503.

Additionally, FIG. 5D illustrates a positive pulse waveform 528 being applied to a transformer 505 resulting in a positive pulse waveform 530 on the upper branch output 514 and a negative pulse waveform 532 on the lower branch output 516 of transformer 505 that when applied propagates along the utility transmission line. It is noted that the above described coupling techniques are exemplary and depending on the application any other type of coupling device for matching the impedance between the RF waveform generator 112 and the utility transmission line 108 within the building may be used.

Figure 5E:
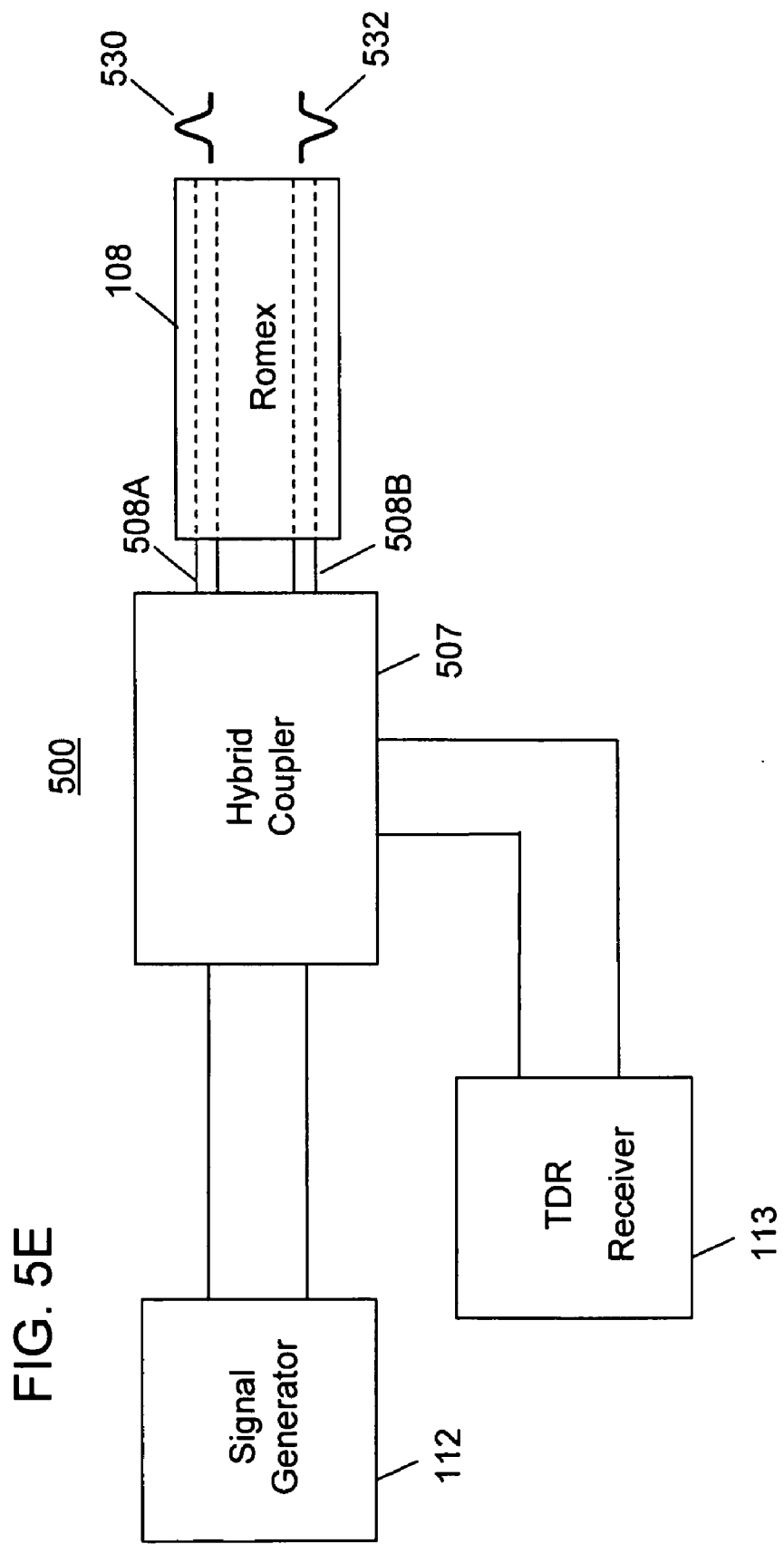
FIG. 5E illustrates use of a hybrid coupler in conjunction with RF waveform generator 112 and TDR receiver 113 to enable TDR techniques in accordance with the present invention.

FIG. 5E illustrates use of a hybrid coupler in conjunction with RF waveform generator 112 and TDR receiver 113 to enable TDR techniques in accordance with the present invention. TDR techniques can be used to determine the length of the utility transmission line wiring 108 between the RF waveform generator 112 and any discontinuity in order to accurately determine time of emission ($t_E$) of RF waveforms at a distal emission point relative to the time when the generated RF waveform is applied to utility transmission line and can be used to assess reflections received from reception points. Various TDR approaches are well known in the art such as those disclosed in U.S. Pat. No. 3,812,423, issued May 21, 1974 to Cronson et al. and U.S. Pat. No. 4,023,154, issued May 10, 1977 to Comeaux, which are incorporated herein by reference. Historically, TDR techniques have been used to determine the location of breaks, shorts, or other impedance discontinuities in electrical wiring. A pulse waveform generated at time $t_G$, propagates down the transmission line wiring 108 and reflects off an impedance discontinuity, such as the outlet 105, and returns at time $t_R$, where the reflected pulse is inverted whenever the impedance at the discontinuity is lower than the impedance of the transmission line wiring 108. Because the time to propagate down the transmission line wiring 108 is the same for the transmitted and reflected pulse waveform, the time a pulse waveform is emitted at the first discontinuity, $t_E$, may be calculated as $t_E = t_G + (t_R - t_G)/2$.

To support the TDR technique, one embodiment of the system of the present invention is augmented with a TDR receiver 113 that allows for reception of RF waveforms along the utility transmission line 108. A duplexer, or hybrid coupler device 507 couples the TDR receiver 113 and RF waveform generator 112 to the utility transmission line 108. One of ordinary skill in the art would recognize that an off-the-shelf duplexer device such as the Hewlett Packard Model 774D Coaxial Dual-Directional Coupler could be used as the hybrid coupler device 507 to support TDR techniques used in accordance with the present invention. The TDR receiver 113 and the RF waveform generator 112 could be augmented with each other to function as a single unit for generating RF waveforms and receiving reflections of the emitted RF waveform along the utility transmission line 108. In fact, reflections of the emitted waveforms can be received either wirelessly by the impulse radio receivers 104A and 104B (FIGS. 1, 2, and 3) via their corresponding antennas or by the TDR receiver 113 via discontinuities along the utility transmission, as further described below.

Generally, TDR techniques can be used to characterize an electrical wiring circuit and its impedance discontinuities. As stated previously, part of a RF waveform arriving at an impedance discontinuity reflects back to its source and part of the RF waveform is emitted. If additional wiring, e.g., an extension cord, exists that couples a discontinuity, e.g., a bulb of an extension lighting fixture, to the transmission line wiring 108, part of the waveform also propagates further down such extension of the transmission line wiring 108. Thus, a given pulse waveform sent down the utility transmission line wiring 108 reflects back, at least in part, by each discontinuity along the wiring or extensions thereof that couples a discontinuity to the transmission line wiring 108. Additionally, a portion of a given reflection returns from its source, so that essentially, smaller and smaller signals bounce back and forth between discontinuities until they are not discernable. Accordingly, by processing of the various times at which reflections return to a source of a transmitted pulse, emission times are determined at multiple discontinuities along the transmission line wiring 108 or its extensions, where discontinuities are coupled to the transmission line wiring 108. For example, lets assume a pulse is sent down transmission line wiring 108 and its extensions, if any, at time $t_G$ and reflections arrive at times $t_{R1}, t_{R2}, t_{R3}, \ldots t_{RN}$. Given assumptions that discount reflections having amplitudes below a given threshold, emission times at various discontinuities along the wiring would be $t_{E1} = t_G + (t_{R1} - t_G)/2$, $t_{E2} = t_G + (t_{R2} - t_G)/2$, $t_{E3} = t_G + (t_{R3} - t_G)/2$, $\ldots t_{EN} = t_G + (t_{RN} - t_G)/2$.

Figure 6:
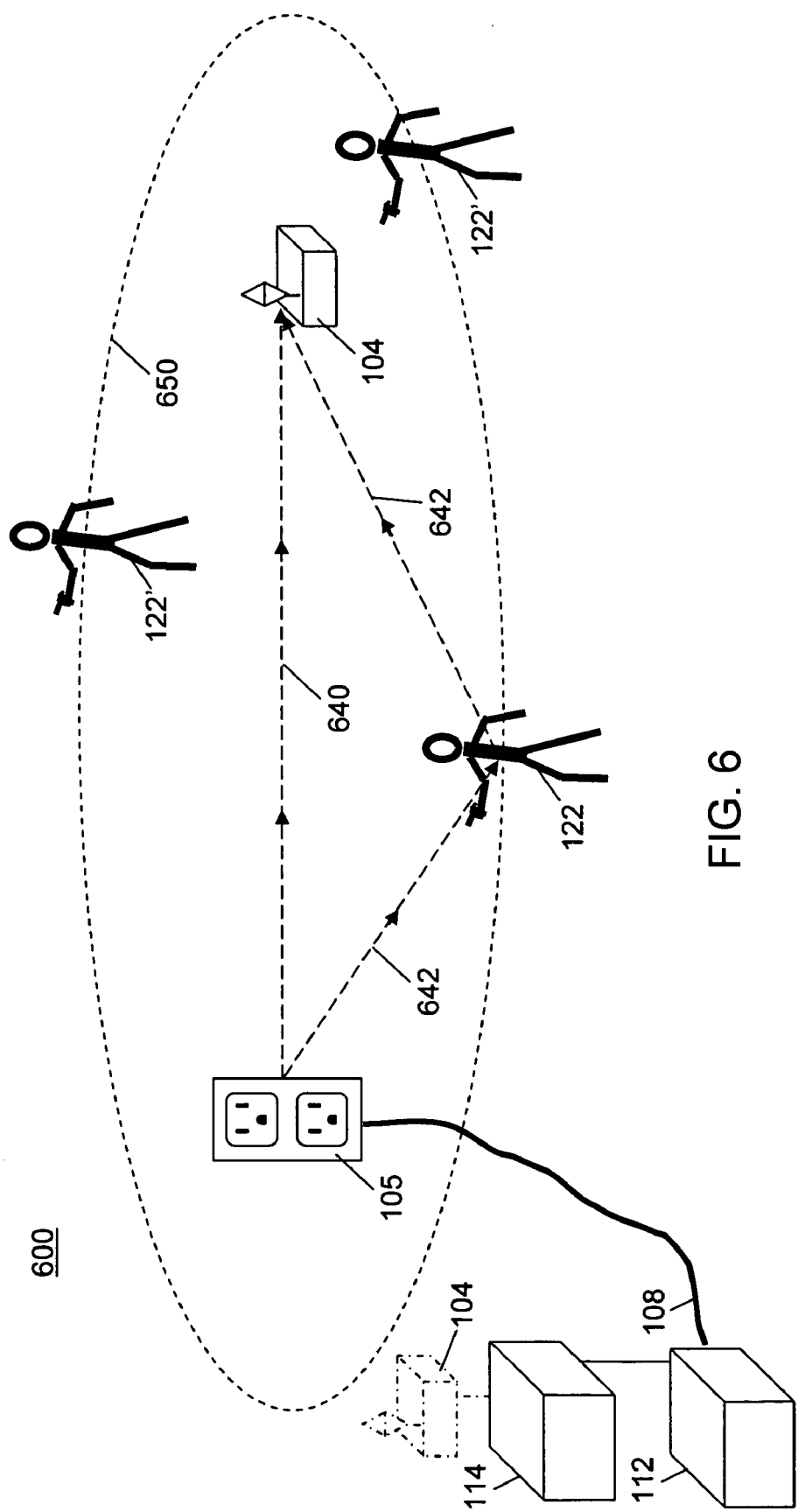
FIG. 6 illustrates the basic components of an intrusion detection system in accordance with the present invention.

FIG. 6 depicts an exemplary system 600 in accordance with one aspect of the present invention. The utility transmission line 108 is coupled to the RF waveform generator 112. The RF waveform generator 112 applies the generated RF waveform to the utility transmission line as described above. The RF waveform propagates along the utility transmission line 108 until the RF waveform encounters an impedance discontinuity, such as the outlet 105, which acts as an emission point. When the RF waveform reaches the impedance discontinuity, part of the RF waveform is emitted into the air and part is reflected back towards the RF waveform generator 112. If additional transmission line wiring 108 connects the outlet 105 to another discontinuity such as switch 107, then part of the RF waveform would continue towards the second discontinuity, and so on. Similarly, if an electrical cord is plugged into the outlet 105, a part of the RF waveform would propagate down the power cord to the corresponding fixture (e.g., lamp, appliance), which being a discontinuity coupled to the utility transmission line 108 would act as an emission point, An emitted RF waveform propagates directly from the point of emission to a point of reception at the receiving impulse radios 104 along a direct path 640. It also reflects from numerous objects, including a target 122 and is received at the reception points indirectly, along the path 642. Thus, the emitted RF waveforms and reflected RF waveforms are received at each reception point via direct and indirect paths.

In accordance with one embodiment of the invention, a bistatic radar arrangement is used to determine temporal characteristics of reflected waveforms from the target 122. As described herein, bistatic radar is a radar system where a radar signal is transmitted from one location and received at another location. In other words, the emission point and the reception point of the bistatic radar are at different locations. On the other hand, monostatic radar has its emission point and reception point at the same location. Monostatic radar and combined monostatic/bistatic radar embodiments of the invention are described further below in relation to other embodiments of the present invention.

Referring again to FIG. 6, the outlet 105 is shown as functioning as an emission point. The impulse radio 104 functions as a reception point, which is located at a different location relative to the emission point at the outlet 105. Together, the emission point from the outlet 105 and reception point at the impulse radio 104 form a bistatic radar. When the RF waveform generator 112 applies the RF waveform to utility transmission line 108, the generated waveform reaches the outlet 105, where a portion of the RF waveform is emitted from this emission point. As illustrated, the emitted RF waveform traverses the direct path 640 from the outlet 105 to the impulse radio 104. The emitted RF waveform also reflects off the target 122 such that the reflected waveform takes on the indirect path 642 to reach the reception point where the impulse radio receiver 104 is located. The impulse radio receiver 104 is equipped to make measurements corresponding to temporal and non-temporal characteristics of the directly received and indirectly received reflected RF waveforms, where such measurements are used for various radar applications in accordance with the present invention. The temporal characteristics of the directly received and reflected RF waveforms include relative or absolute time of arrivals at the reception point, where as the non-temporal characteristics include absolute or relative voltage or current measurements. Such measurement information is then communicated to the processor 114 for processing.

In one embodiment, the processing of the information is used to create an RF profile of the environment within which the radar system of the invention operates. Such RF profiling would correspond to representation of the emitted RF waveform being filtered by the environment around the emission point and the reception point. The RF profile can be represented in any suitable fashion, including in time domain or frequency domain. In case the impulse radio receiver 104 employs coherent integration, the measurement value would correspond to a summation of multiple voltage or current measurements.

Figure 7A:
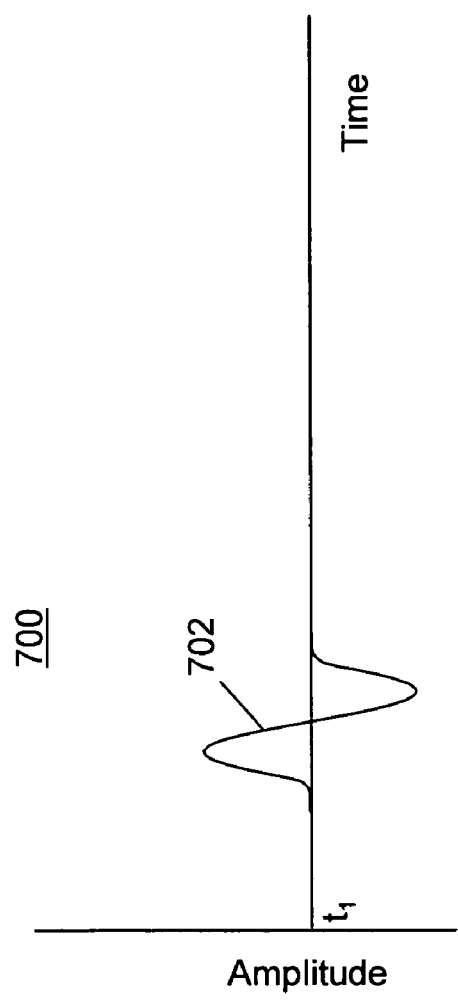
FIG. 7A illustrates a radio frequency (RF) profile of a timing diagram for a received RF waveform without a target present.
Figure 7B:
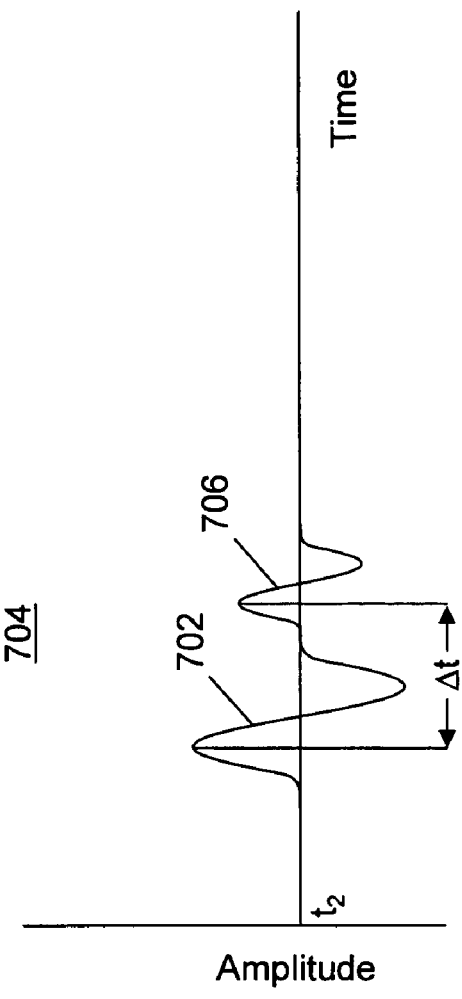
FIG. 7B illustrates a RF profile of a timing diagram for a received RF waveform with a target present.

FIGS. 7A and 7B illustrate RF waveforms received by the impulse radio 104 through the direct path 640 and indirect path 642. FIG. 7A corresponds to the emitted RF waveform 702 having traversed the direct path 640 of FIG. 6 to be received by the impulse radio 104 without encountering any target. In contrast, FIG. 7B comprises emitted RF waveform 702 having traversed the direct path 640 and the reflected RF waveform 706 having traversed the indirect path 642, which occurs when the target 122 is present within the environment. One of ordinary skill in the art would recognize that there can be many items (e.g. walls, trees, furniture, file cabinets, etc.) within the range of the emission and reception points that could cause a multipath reflection and that the resulting RF profile would typically be much more complex than that shown in FIGS. 7A and 7B. However with enough processing power, such RF profiles can be processed in accordance with the present invention to characterize the environment for various types of applications, e.g. intrusion detection, positioning, tracking, etc.

In accordance with one embodiment of the present invention, the presence of a target within the environment is detected by comparing one RF profile(s) to another RF profile. For example, RF profile 700 representing the environment without a target could be a reference RF profile taken at a reference time that is compared to a RF profile taken at a later time, where any difference between these RF profiles indicates a change in the environment, which could indicate the presence of a target. More specifically, a significant difference in the compared RF profiles, which may be determined, for example, by subtracting the reference RF profile from the later RF profile, reveals the presence of a target and even the range to the target with respect to the reception point and/or emission point. Although, RF profiles 700 and 704 are of simple nature to make it easy for one to visualize comparison of RF profiles, it should be understood that regardless of the complexity of the reference and subsequent RF profiles, it is the difference between the two profiles that indicates the presence or absence of a target (or targets).

Preferably, the present invention uses clutter thresholds to address any inaccuracies such as those caused by timer drift and small amplitude variations of the receiving impulse radio during RF profile comparison (e.g., subtraction). The clutter threshold is selected to allow for distinguishing a change in the RF profile from the clutter by a predefined amount (e.g., difference in amplitude).

The system of the present invention need not operate where the reference RF profile is generated without the target being present. For example, the system may be operated at a first time in which the presence and location of various objects within building 102 are unknown. Under this arrangement, the RF waveform generator 112 applies the generated RF waveform through the utility transmission line wiring 108 to the outlet 105, which functions as a discontinuity or an emission point, where the RF waveform is emitted in all directions and reflects off the objects within building 102. The RF waveform reflections are subsequently received at one or more impulse radio(s) 104 and processed by comparison of RF profiles taken at different times for detecting the presence of an object, tracking an object, or any intrusion.

Typically, the first RF waveform received by the impulse radio is the RF waveform that traverses the direct path between the emission point and the reception point. At some time after the direct path RF waveform is received, the indirect path (multipath) reflections arrive at the reception point. The multipath reflections may constructively or destructively interfere with one another. The multipath reflections arrive at different times depending on the distances traveled and the number of reflections experienced across the indirect paths. The measured values indicative of the received direct and indirect multipath reflections are stored at the processor 114 and used to create the RF profile of the environment.

The first RF profile generated by the processor 114 provides a basis of comparison for later created profiles for use in various applications. For example, by comparing differences in the multipath reflections, movements of target (i.e., direction and speed) can be detected. The processing of the received RF waveform reflections could take advantage of the fact that most objects within building 102 are fixed and the RF waveforms create substantially the same multipath profile after successive RF waveform emissions, thereby simplifying the required processing. As a target moves within building 102, subsequent RF profiles measure different multipath reflections caused by the change in location of the target when compared with the previously measured profiles. The change between the multipath RF profiles represents addition, removal, or movement of the object and/or target within the building. The present invention can also be used to track the movement and speed of a target. Through examining a series of profiles over a measured period of time, the differences in distance between successive profiles can be used to measure the speed and direction of the target.

The system may also be trained to recognize certain features, for example, by having certain objects placed near the emission point at certain times and to recognize when these objects have been removed. Subtracting an RF profile corresponding to a first emitted RF waveform from another RF profile corresponding to a second emitted RF waveform removes the common multipath reflections caused by fixed objects within building 102 between the successively emitted first and second RF waveforms. The remainder of the profile will be the multipath reflection from the target at the time the second RF waveform is emitted.

Knowledge about which indirect path corresponds to the target can then be used to determine the indirect path distance from the target traveled between the reception point and the emission point. By knowing the distance between the emission point from the outlet 105 to the reception point at impulse radio 104, and by knowing the relative time delay of the reflected RF waveform compared with the direct path, the position of the target 122 would be known to lie somewhere on an ellipsoid whose foci are the emission point and reception point, as shown in FIG. 6. For simplicity, FIG. 6 depicts a cross-section of an ellipsoid 650 having a constant elevation. FIG. 6 also illustrates an ambiguity that exists in term of the location of a target. The ambiguity is shown by target being at alternate locations (122') on the ellipsoid, including some point at a different elevation than the ellipse 650 shown in FIG. 6. As is well known, an ellipsoid is a quadric that is a higher dimensional analogue of an ellipse, where an ellipse can be defined as the locus of all points, in a given two-dimensional plane, which have the same sum of distances from two given fixed points, called loci, plural of locus. In other words, the sum of the distance from one locus to any point on the ellipse plus the distance from that point to the other locus is the same for any point on the ellipse. Similarly, an ellipsoid can be defined as the locus of all points, in three dimensions, which have the same sum of distances from two given fixed points.

Figure 8A:
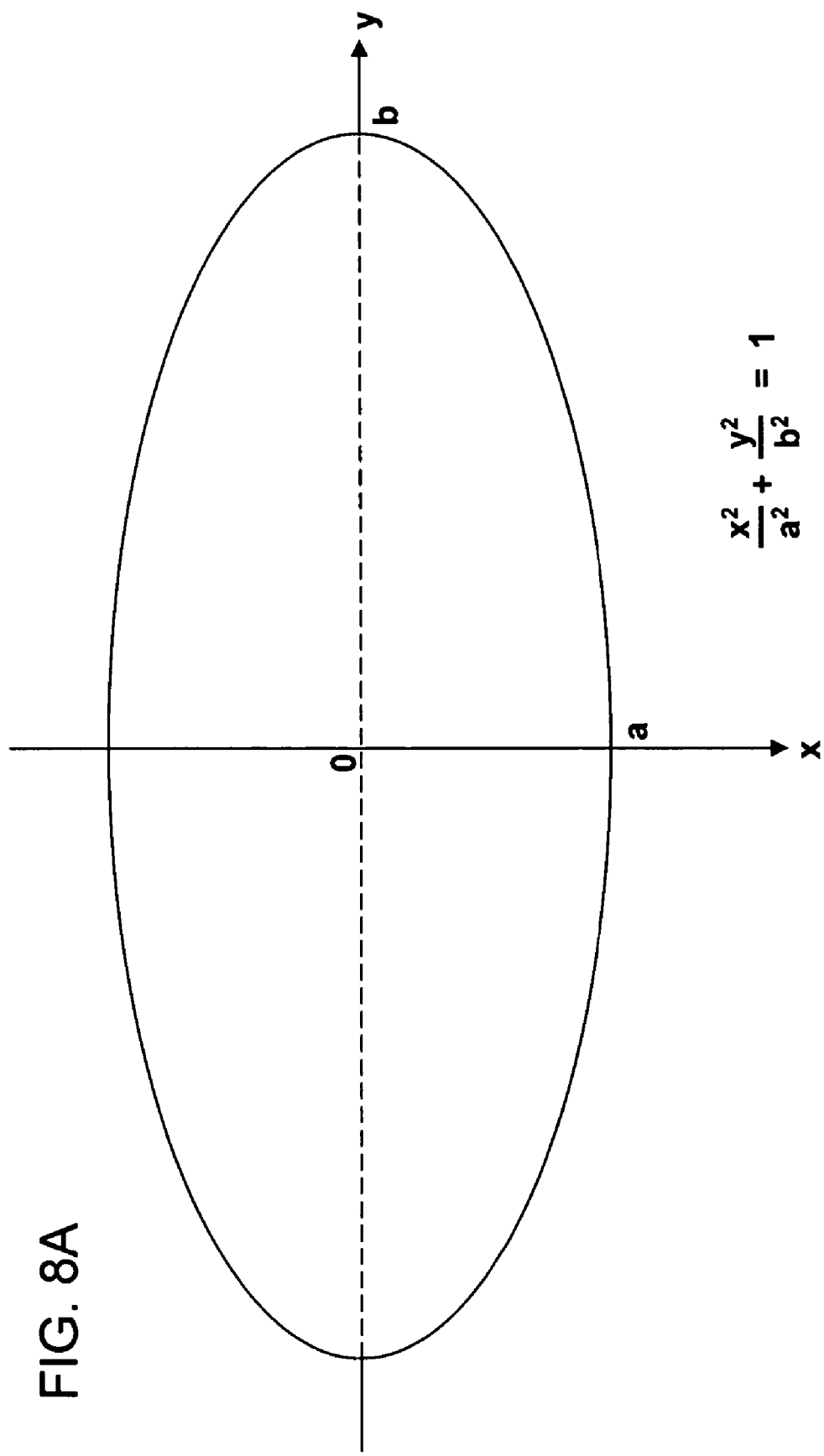
FIG. 8A shows an ellipse in a x-y Cartesian coordinate system.

The equation of an ellipse in a x-y Cartesian coordinate system is:

$$(x^2/a^2)+(y^2/b^2)=1, \qquad \text{Equation 1}$$

and the equation of an ellipsoid in a x-y-z Cartesian coordinate system is:

$$(x^2/a^2)+(y^2/b^2)+(z^2/c^2)=1, \qquad \text{Equation 2}$$

where a, and b (and c) are distances from the center of the ellipse (ellipsoid) to the perimeter/surface of the ellipse (ellipsoid) as depicted in FIG. 8A and FIG. 8B, respectively.

Relative to an emission time of the generated RF waveform, the times of reception of the emitted RF waveform along the direct path 640 and the indirect path 642 represents the lengths of the direct and indirect paths. The length of the indirect path 642 indicates the target to be in one of many locations on an ellipsoid, which is represented two dimensionally by ellipse 650 in FIG. 6. By using multiple impulse radios, multiple overlapping ellipsoids to the target 122 can be used to indicate the possible locations of the target 122. Additional impulse radios can resolve any ambiguities regarding the location of the target, as described further below.

Figure 9:
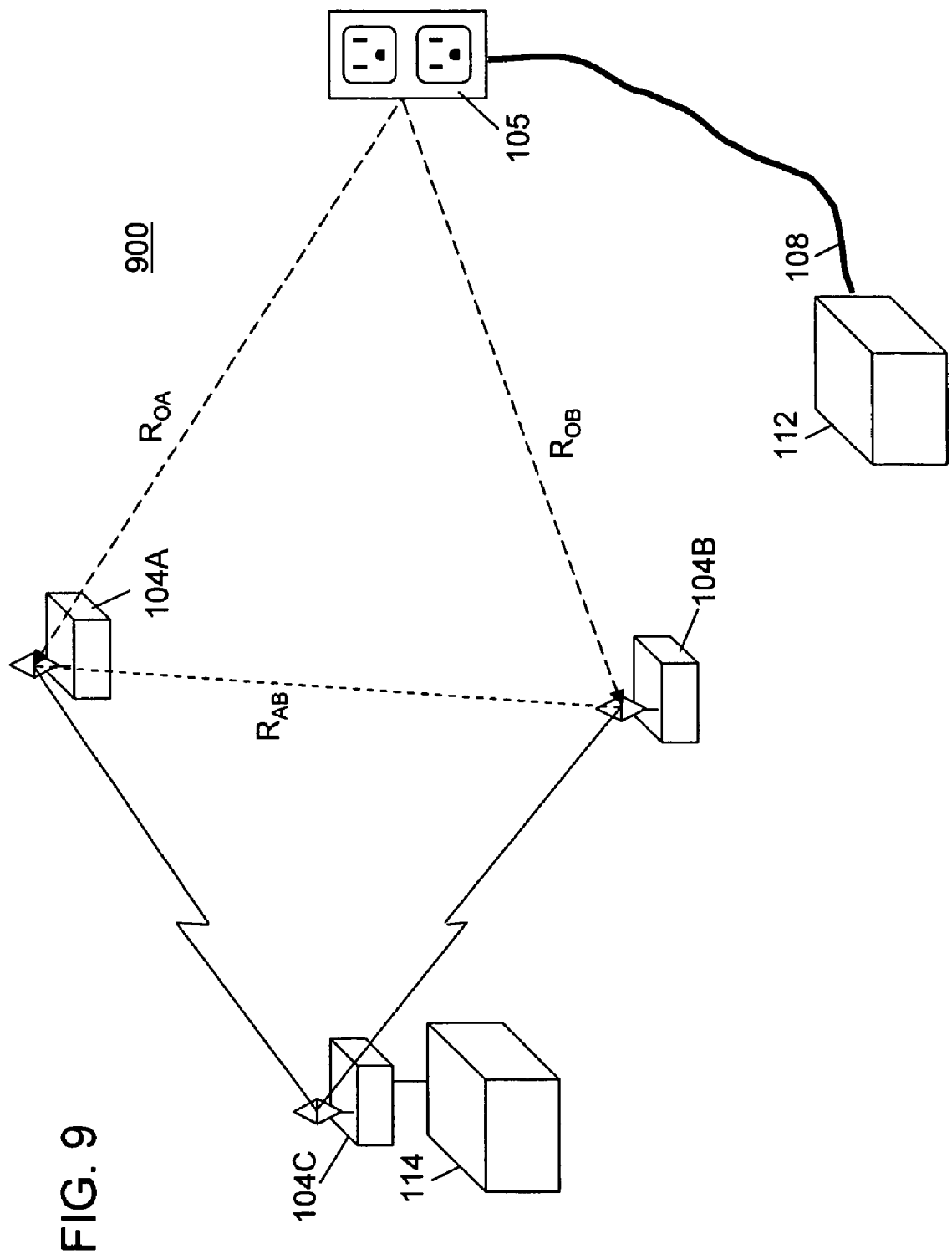
FIG. 9 illustrates a system view of the object detection system according to the present invention.
Figure 15:
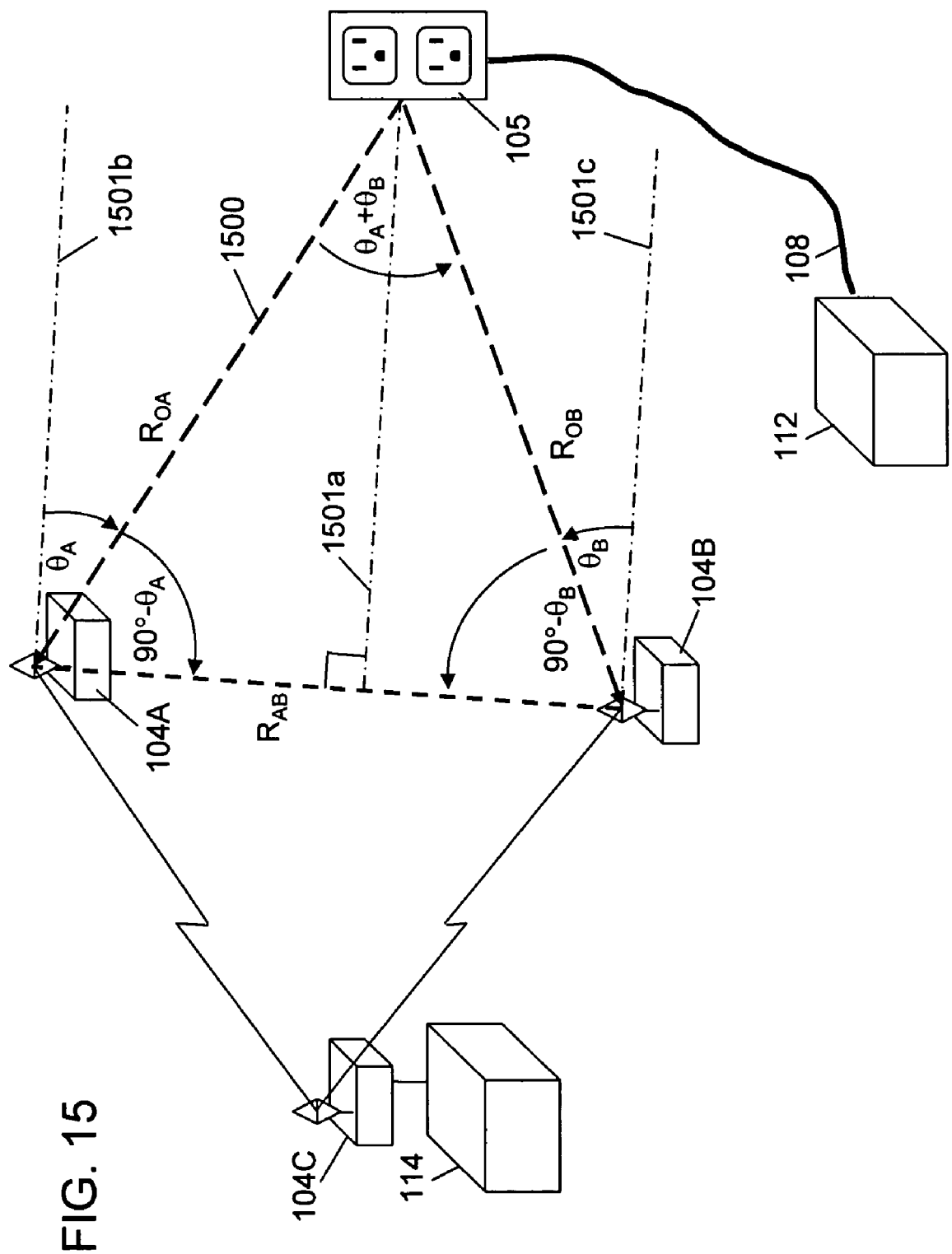
FIG. 15 depicts the object detection system according to an embodiment using impulse radios having direction finding antennas.

FIG. 9 illustrates an exemplary embodiment of the present invention, where the outlet 105 comprises the emission point for the generated RF waveform and the impulse radios 104A and 104 B comprise the reception points. The RF waveform generator 112 is coupled to the utility transmission line wiring 108, where the generated RF waveform propagates along the utility transmission line wire 108 until the RF waveform reaches the discontinuity at the outlet 105 (or any other discontinuity described above that would constitute an emission point), when it is emitted. The emitted RF waveform reflects off the target and objects within the building and the reflections are received by the impulse radios 104A and 104B, which are located at corresponding reception points. As described before, the impulse radios 104A and 104B are coupled to the processor 114 through wireless or wired links to convey data pertaining to the received direct and reflected RF waveforms. In FIG. 9, a third impulse radio 104C provides the communication link between the processor 114 and impulse radio receivers 104A and 104B. The impulse radios 104A and 104B are placed at known reception points $(x_A,y_A)$ and $(x_B,y_B)$ relative to the building 102. The RF waveform generator 112 applies the generated RF waveform to the utility transmission line wiring 108 at time $t_G$, which is emitted at time $t_E$ from the emission point at the outlet 105, which could be at a known or an unknown location in the building (x,y). As described above, one method of determining the emission time $t_E$ is by using Reflectometry techniques. From the emission point, the emitted RF waveform travels a direct path and is received at corresponding reception points by impulse radio 104A and 104B at times $t_A$ and $t_B$, respectively. The distance $R_{AB}$ between the impulse radios 104A and 104B can be determined based on the speed of RF waveform propagation along the utility transmission line 108 after the waveform is applied and the speed of the emitted RF waveform in free space, which is the speed of light, c. Based on such known information regarding the transmitted and received waveforms, the location of the emission point (x, y) can be determined, as described later in connection with FIG. 15. Alternatively, the emission point may be determined using blue prints or drawings for the building. Once the location of the emission point is determined, the location of an object reflecting the emitted RF waveforms can also be determined.

The following equations govern the relationship between the various elements of the system:

$$R_{OA}/c = t_A - t_E \qquad \text{Equation 3}$$

$$R_{OB}/c = t_B - t_E \qquad \text{Equation 4}$$

$$t_A - t_B = (R_{OA} - R_{OB})/c \qquad \text{Equation 5}$$

$$R_{OA} = ((x-x_A)^2 + (y-y_A)^2)^{1/2} \qquad \text{Equation 6}$$

$$R_{OB} = ((x-x_B)^2 + (y-y_B)^2)^{1/2}, \qquad \text{Equation 7}$$

where the distance from the outlet 105 to each impulse radio 104A and 104B is $R_{OA}$ and $R_{OB}$, respectively, and the distance between the two impulse radios is $R_{AB}$. Based on these equations, various methods may be used to determine the location of the outlet 105 (x, y) and the emission time $t_E$, as described below. In solving the above listed equations, the known relationship between the impulse radios and the building can be used to resolve ambiguities in the position of the target. For example, in order to determine a two-dimensional (2D) position of the target, the position of three points must be known, i.e. the outlet 105 at the emission point and the impulse radio 104A at the first reception point and the impulse radio 104B at the second reception point.

As stated before, additional impulse radios may be used to resolve ambiguities in the equations and to increase confidence levels in the location of the target. For example, in order to determine three-dimensional (3D) coordinates, an additional impulse radio receiver may be employed in FIG. 9. The 3D ambiguities may be narrowed by information on the building layout. Ambiguous can also be resolved through user knowledge of the approximate position of the target. The user of the system could enter information on approximate locations of the moving target to facilitate the position determination. This information could include visual or blueprint information on the approximate location of the target. For example, if a target is known to be moving on the second floor of a building, this position information could be entered into the processor 114 to eliminate any solutions that place the target on other floors.

This embodiment of the present invention uses TDR techniques described above to determine the emission time $t_E$. As stated in connection with FIG. 5e, the time a pulse is emitted at the first discontinuity, $t_E$, may be calculated as $t_E = t_G + (t_R - t_G)/2$. Given values for $t_E$, $t_A$, and $t_B$; $R_{OA}$ and $R_{OB}$ can be calculated using equations 3 and 4 above; and thereafter the coordinates of the outlet 105 (x,y) may be derived using equations 6 and 7. Once the location of the emission point (x,y) and time of emitting, $t_E$, are determined, the location and other information regarding an object can be determined from reflections of the emitted RF waveforms off the object. This is accomplished by determining an ellipsoid on which the target object resides using the techniques described previously.

Figure 10:
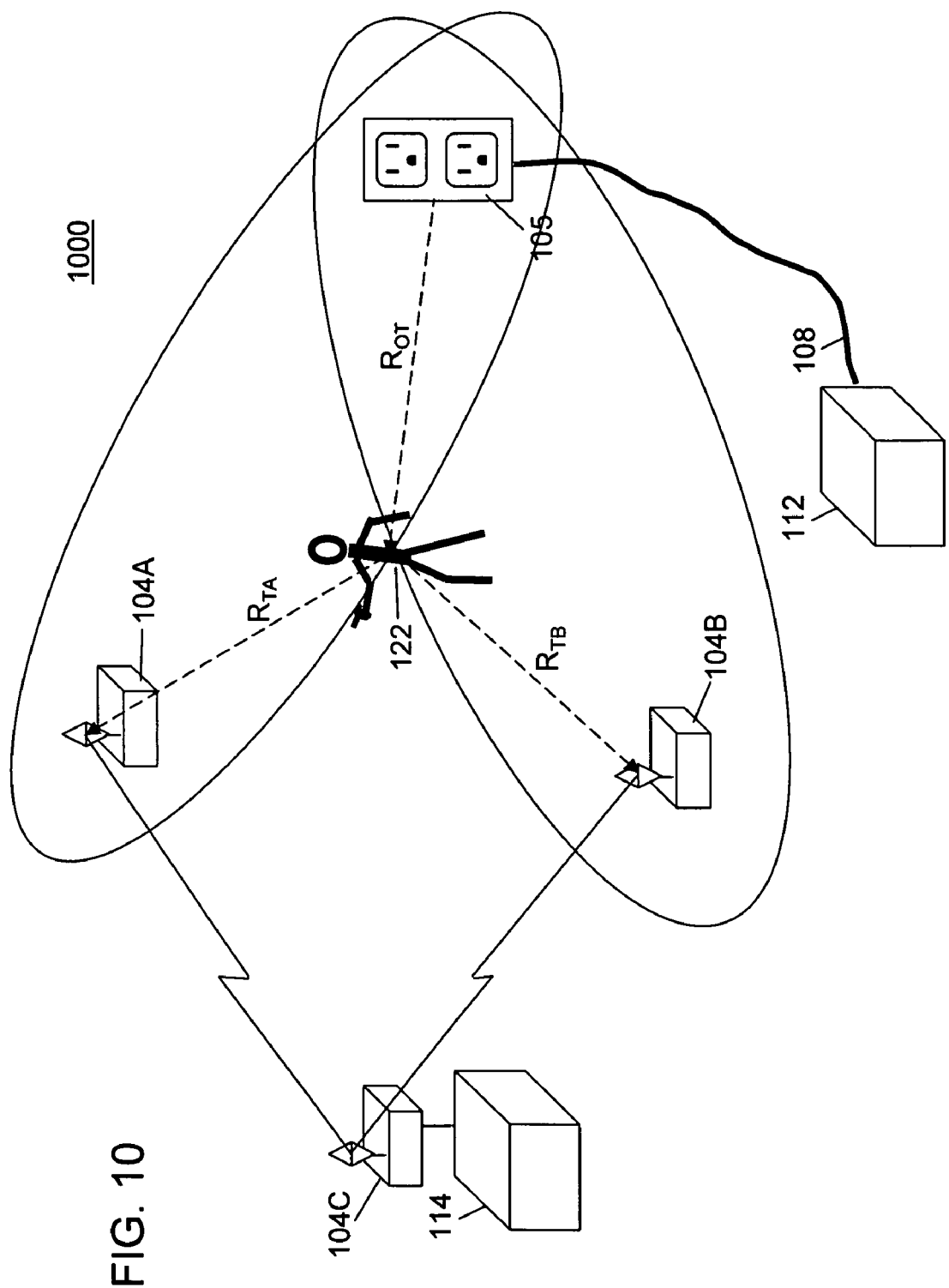
FIG. 10 illustrates the system view of the object detection system of FIG. 9 in the presence of a target.

FIG. 10 illustrates an exemplary system in which two receiving impulse radios 104A and 104B are provided at known locations $(x_A,y_A)$, $(x_B,y_B)$ with respect to the building 102. Each of the two combinations of the outlet 105 and one or the other impulse radio 104A and 104B at corresponding reception points form a bistatic radar system. The impulse radios 104A and 104B are wirelessly connected to the processor 114. The distance from impulse radio 104A to the target 122 is $R_{TA}$, the distance from impulse radio 104B to the target 122 is $R_{TB}$, and the distance from the outlet 105 to the target 122 is $R_{OT}$. The times $t_{AR}$, $t_{BR}$ at which the reflected (indirect) signal arrives at the reception points of the two impulse radios 104A and 104B are known and the time of emission $t_E$ from the outlet 105 and the coordinate $(x_O,y_O)$ of the outlet 105 are either known or determined using the TDR technique described above. Time on target, $t_T$, and the coordinate of the target, $(x_T, y_T)$ can therefore be calculated using equations 8 through 15.

$$R_{OT}/c = t_T - t_E \qquad \text{Equation 8}$$

$$R_{TA}/c = t_{AR} - t_T \qquad \text{Equation 9}$$

$$R_{TB}/c = t_{BR} - t_T \qquad \text{Equation 10}$$

$$R_{TB} + R_{OT} = c(t_{BR} - t_E) \qquad \text{Equation 11}$$

$$R_{TA} + R_{OT} = c(t_{AR} - t_E) \qquad \text{Equation 12}$$

$$R_{OT} = ((x_O - x_T) + (y_O - y_T)) \qquad \text{Equation 13}$$

$$R_{TA} = ((x_T - x_A)^2 + (y_T - y_A)^2)^{1/2} \qquad \text{Equation 14}$$

$$R_{TB} = ((x_T - x_B)^2 + (y_T - y_B)^2)^{1/2} \qquad \text{Equation 15}$$

As can be seen, the system of FIG. 10 is implemented with multiple impulse radios interacting with the emission point to triangulate the current position of the target. Coordinating the measured target ranges of multiple impulse radios at corresponding reception points allows for precise positioning of the target via an intersection of ellipses that are formed based on each pair of measured distances between each of the multiple reception points and the emission point.

As described relative to FIGS. 9 and 10, the impulse radios associated with the reception points (i.e., the impulse radios 104A and 104B) comprise wireless radios, with differently located reception points that form a bistatic radar arrangement. However, in another embodiments shown in FIG. 11, the TDR receiver 113 is associated with a reception point that comprise a discontinuity coupled to the utility transmission line 108 and the system of this embodiment of the invention utilizes a combined monostatic/bistatic radar arrangement. Under this arrangement, the impulse radio 104A is associated with one reception point. However, another reception point comprises the same discontinuity along the utility transmission line as the emission point. In other words, the outlet 105 itself, which comprises the discontinuity for the emission point, also provides a reception point, which is associated with the TDR receiver 113 coupled to the utility transmission line 108. More specifically, the RF waveform generator 112 generates an RF waveform at $t_G$, and the TDR receiver 113, which is shown as co-located with the RF waveform generator 112, receives reflections from the discontinuity at the outlet 105 at $t_{R1}$. Through the discontinuity at the outlet 105, the TDR receiver 113 also receives a reflection off target 122 at $t_{R2}$. Thus, the reflections of the emitted RF waveform under this embodiment are also received by the TDR receiver 113 (shown as a part of the RF waveform generator 112). Accordingly, the emissions and reception of reflections at the outlet 105 forms a monostatic radar arrangement where the emission point and the reception point are at the same location. Under this arrangement, the time of emission from the outlet 105 is $t_E = t_G + (t_{R1} - t_G)/2$ and the time of arrivals for reflections from the target 122 is $t_T = t_G + (t_{R2} - t_G)/2$. The monostatic radar range from the outlet 105 to target 122 is then calculated by the processor 114 using equation 16.

$$R_{OT} = c(t_T - t_E) \qquad \text{Equation 16}$$

Figure 11:
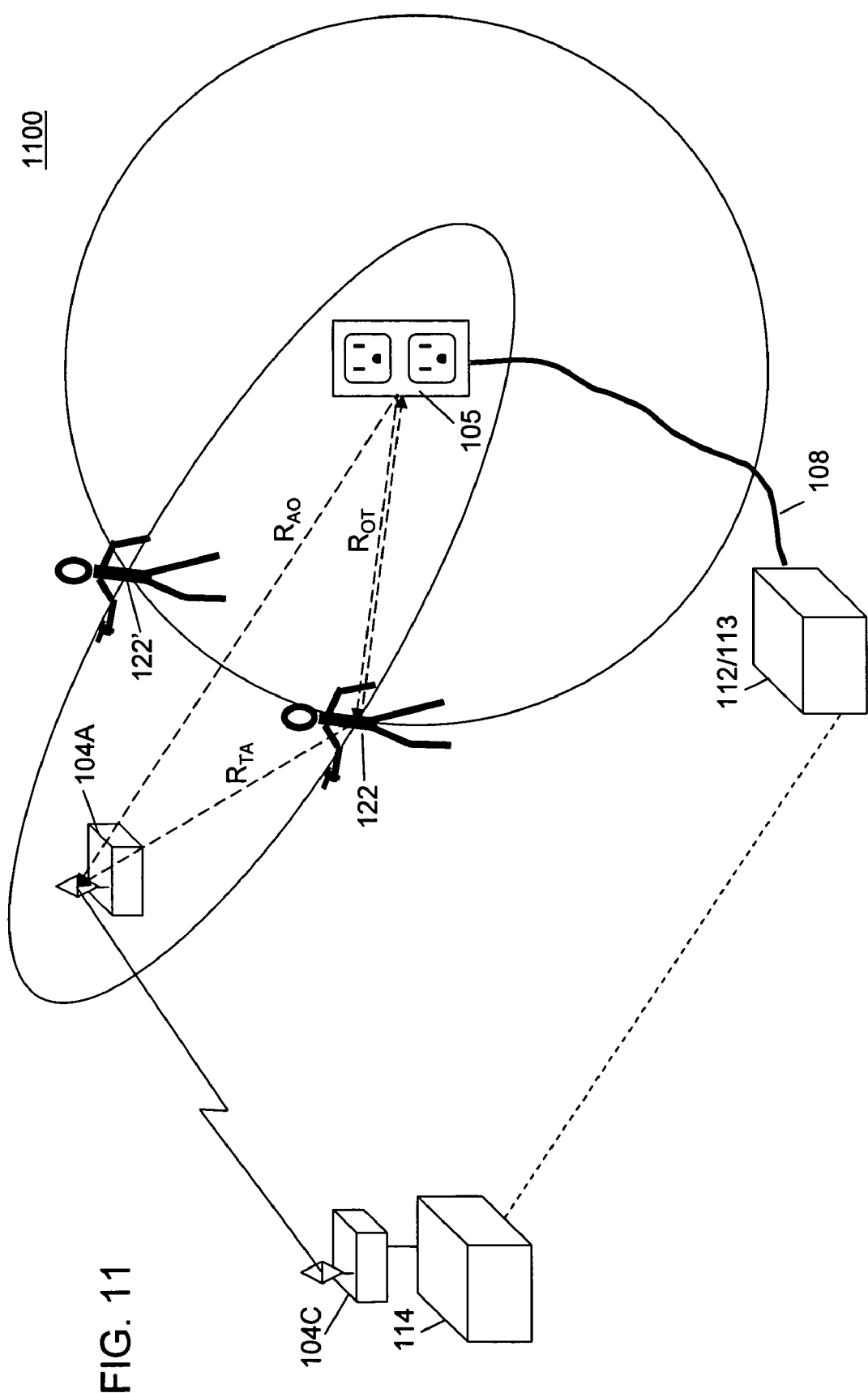
FIG. 11 illustrates the object detection system according to an embodiment of the invention using an impedance discontinuity to emit and receive RF waveforms.

The embodiment of FIG. 11 also has a bistatic radar arrangement formed by the emission point at the outlet 105 and reception point at the impulse radio 104A. Given a first arrival time at impulse radio 104A of a direct path signal, $t_{AD}$, and a later arrival time of at impulse radio 104A of the reflected signal off target 122, $t_{AR}$, the distance from the outlet 105 to impulse radio 104A is calculated using equation 17 and the distance from the target to impulse radio 104A is calculated using equation 9, respectively.

$$R_{AO}=c(t_{AD}-t_E) \qquad \text{Equation 17}$$

Provided that $R_{OT}$, $R_{AO}$, and $R_{TA}$, and coordinate $(x_O, y_O)$ of the outlet 105 and the coordinate $(x_A, y_A)$ of impulse radio 104A are known, then equations 13 and 14 above is used to determine possible coordinates of the target $(x_T, y_T)$. As in prior Figures, FIG. 11 displays only two dimensions of an ellipsoid upon which the target might reside. Assuming the target is in a constant elevation plane then the possible coordinates occur on each side of the ellipse shown in FIG. 11. In some instances, information about the location of the building 102 may be used to resolve which of the two possible coordinates is correct. Alternatively, one or more additional impulse radios can be used to resolve the ambiguity.

Figure 12A:
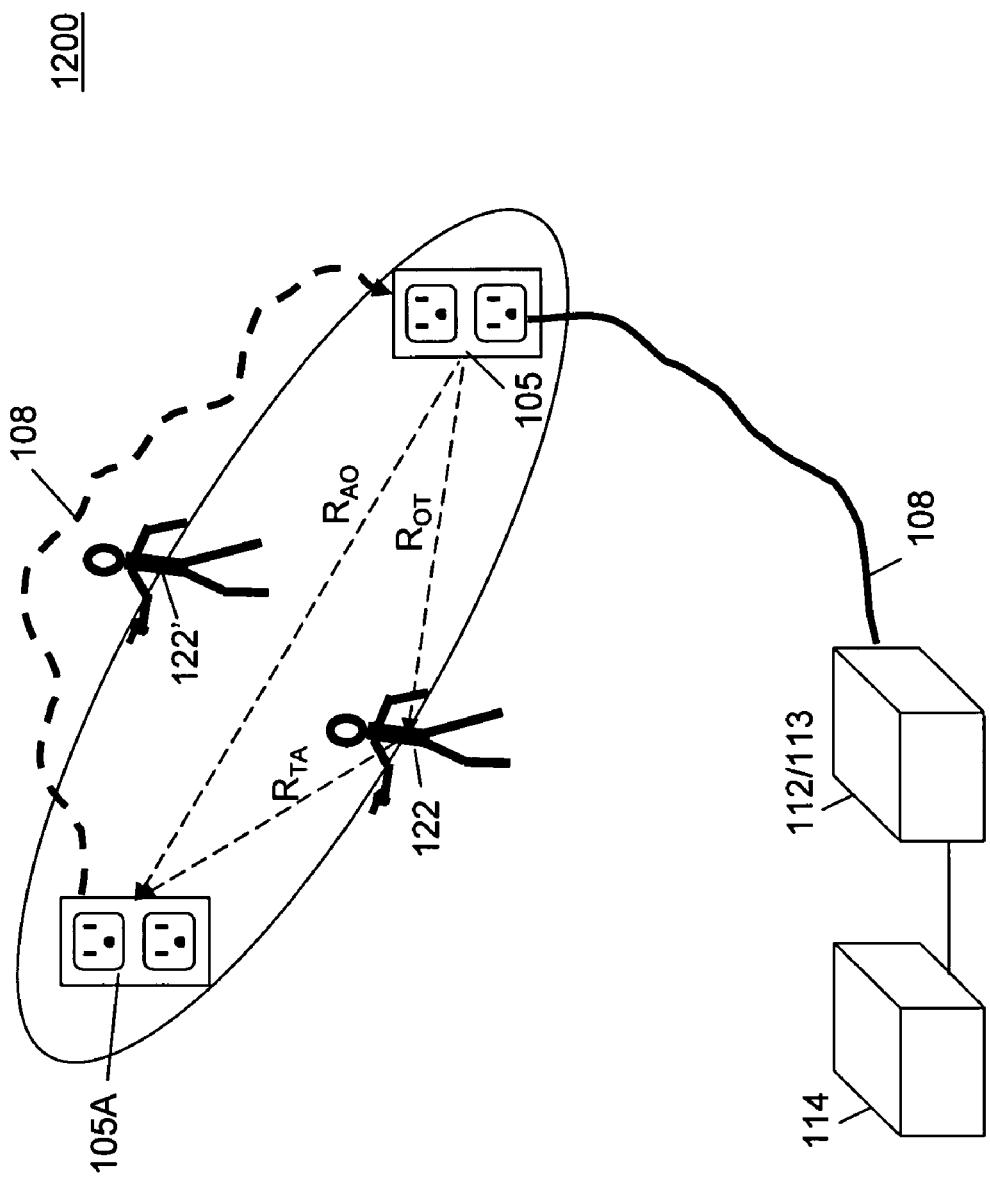
FIG. 12A illustrates the object detection system according to an embodiment of the present invention using the outlets coupled to a common circuit to detect intrusion.

In a further embodiment shown in FIG. 12A, one impedance discontinuity such as the outlet 105 may operate as an emission point and another impedance discontinuity such as an outlet 105A may operate as a reception point. Under this embodiment, the outlet 105 emits the generated RF waveforms to be received at the outlet 105A. The reflected RF waveforms received at the outlet 105A travels back along the transmission line 108 (as shown by the arrowed dotted line) to be received by the TDR receiver 113. Using TDR techniques, the time of emission, $t_E$, from the outlet 105, time of arrival of reflection from target, $t_T$, and time of reception at the second outlet 105A of both the direct path RF waveform and the reflected RF waveform, $t_{AD}$ and $t_{AR}$, respectively, are determined. As can be seen from this embodiment, the reception points at the outlets 105A and 105 are associated with the TDR receiver 113 (as opposed to impulse radios shown in FIG. 10). The TDR receiver conveys the temporal measurements to the processor 114 for processing. If the coordinates of the two outlets 105 and 105A are known, the equations similar to those above can be used to solve for the coordinates of the target.

Figure 12B:
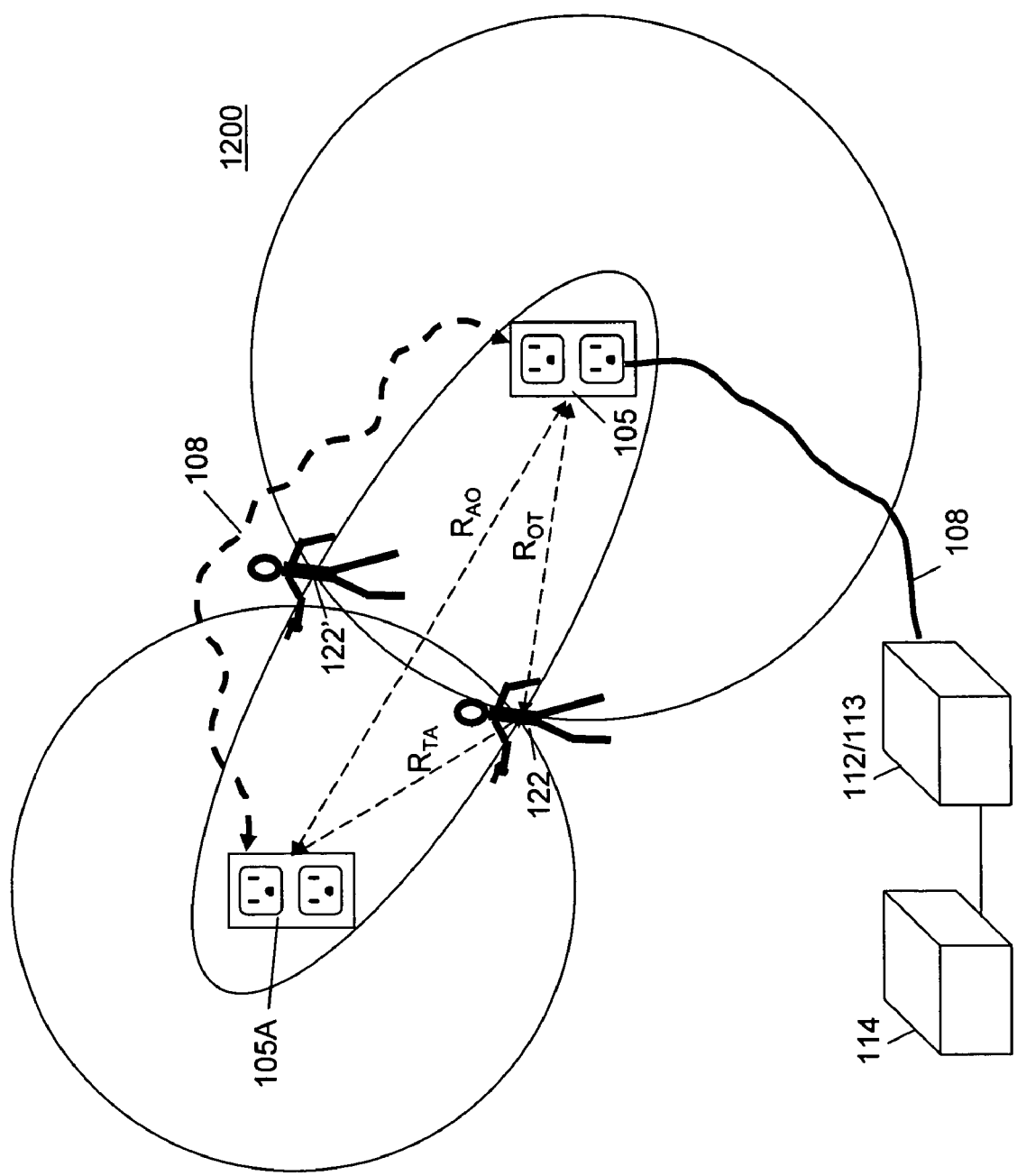
FIG. 12B illustrates the object detection system according to an alternative embodiment of the present invention using the outlets coupled to a common circuit to detect intrusion.

In still another embodiment shown in FIG. 12B, each of the two discontinuities at the outlets 105 and 105A operates as emission and reception points. As such, each of the outlets 105 and 105A form a monostatic radar arrangement of their own. Also, together, they form a bistatic radar arrangement. In other words, each outlet individually form the co-located emission and reception point of a monostatic radar and together form the distal emission and reception points of a bistatic radar. As depicted in FIG. 12B, the intersection of the ellipse of the bistatic radar and the circles of the monostatic radars can be used to resolve ambiguities concerning the correct position of target 122.

In yet another embodiment, one or more impulse radios generate and transmit RF waveforms such that they are emission points. This is in contrast with the previous embodiments that use the RF waveform generator 122 for generating RF waveforms applied to the utility transmission lines to be emitted. Under this arrangement, one or more impedance discontinuities (e.g., outlets) along the utility transmission lines act as reception points for receiving direct and indirect path reflections of RF waveforms transmitted by the impulse radios. As can be seen, this arrangement is the reverse of the embodiments described in FIGS. 6, 9, 10, 11, 12A, and 12B, where the impulse radios 104A and 104B comprise the reception points and the outlet 105 was described as the emission point. One with ordinary skill in the art would recognized that when the direction of travel of the RF waveform is reversed, the governing equations for determining ranges, coordinates, etc. are the same or similar to those provided above. One difference between the two approaches is in the interpretation of the TDR information. Whereas, when the outlet 105 is used as an emitting point, the time of emission of the generated RF waveform is $(t_G-t_{R1})/2$ after generation by the waveform generator, on the other hand, when the outlet 105 is a reception point, the time of reception of the RF waveform transmitted by the impulse radio at the outlet 105 is $(t_G-t_{R1})/2$ before it is received at the waveform generator.

Therefore, according to the invention, either one of the discontinuities or impulse radios can operate as either emission points or reception points or both. Each emission point has a corresponding emitter in the form of a impulse radio (transmitter) or a RF waveform generator, and each reception point has a corresponding receiver, for example, the wireless impulse radios (receivers) 104A or 104B (FIG. 10) or the TDR receiver 113 (FIG. 11 or 12A or 12B) that is coupled to utility transmission line 118. Any impedance discontinuities, any impulse radios, or any combination of impedance discontinuities and/or impulse radios can operate either as bistatic and/or monostatic radars, or a combination thereof as described above and further below. Thus, in accordance with the invention, a wide variety of combinations of radios and impedance discontinuities can be used in accordance with the present invention for various radar applications.

Figure 13A:
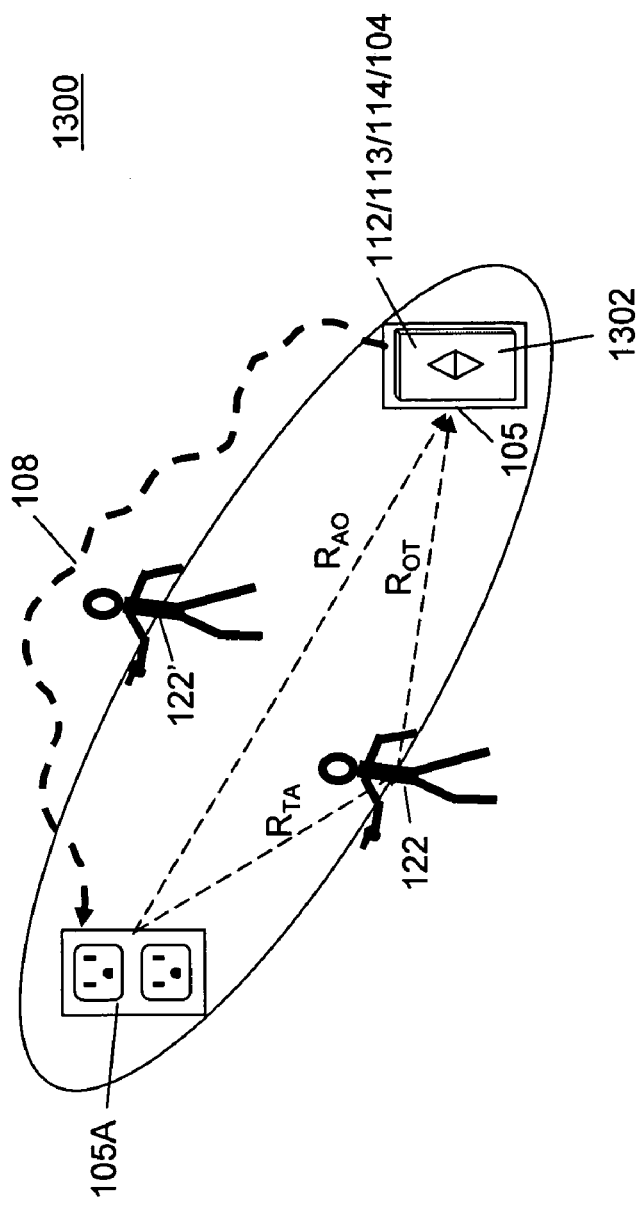
FIG. 13A illustrates the object detection system according to another embodiment of the present invention using the outlets coupled to a common circuit to detect intrusion.

FIGS. 13A and 132B illustrate a further embodiment of the present invention where an apparatus 1302 that includes the RF waveform generator 112, processor 114, TDR receiver 113 and impulse radio 104 function as a single unit, where the unit is plugged into the outlet 105. The impulse radio can be a transmitter, a receiver, or a transceiver. The apparatus 1302 may receive its power from the outlet 105 or have its own power supply (e.g., a battery). The outlet 105 may be coupled via the transmission line wiring 108 to one or more other impedance discontinuities, such as other outlets. Under one arrangement depicted in FIG. 13A, the RF waveform generator 112 incorporated into the apparatus 1302 generates a RF waveform that propagates down the transmission line wiring 108. A distal impedance discontinuity such as the outlet 105A emits a portion of the RF waveform that is received by the impulse radio incorporated into the apparatus 1302 both directly and indirectly via target 122. Under another arrangement depicted in FIG. 13B, the RF waveform generator incorporated into the apparatus 1302 generates a RF waveform that is emitted at the outlet 105 and received at a distal impedance discontinuity such as the outlet 105A both directly and indirectly via target 122. The received RF waveforms propagate down the transmission line wiring 108 to the TDR receiver 113 incorporated in the apparatus 1302. With either arrangement, the outlet 105A and the apparatus 1302 act together as a bistatic radar where $t_G$ is equal to $t_E$ (or substantially equal requiring calibration) since the waveform generator and TDR receiver 113 are at the outlet 105 as well. Alternatively, the apparatus 1302 of FIG. 13A and FIG. 13B can be configured such that both the apparatus 1302 and the outlet 105A operate individually as monostatic radars and/or together as a bistatic radar, as described above.

Figure 13B:
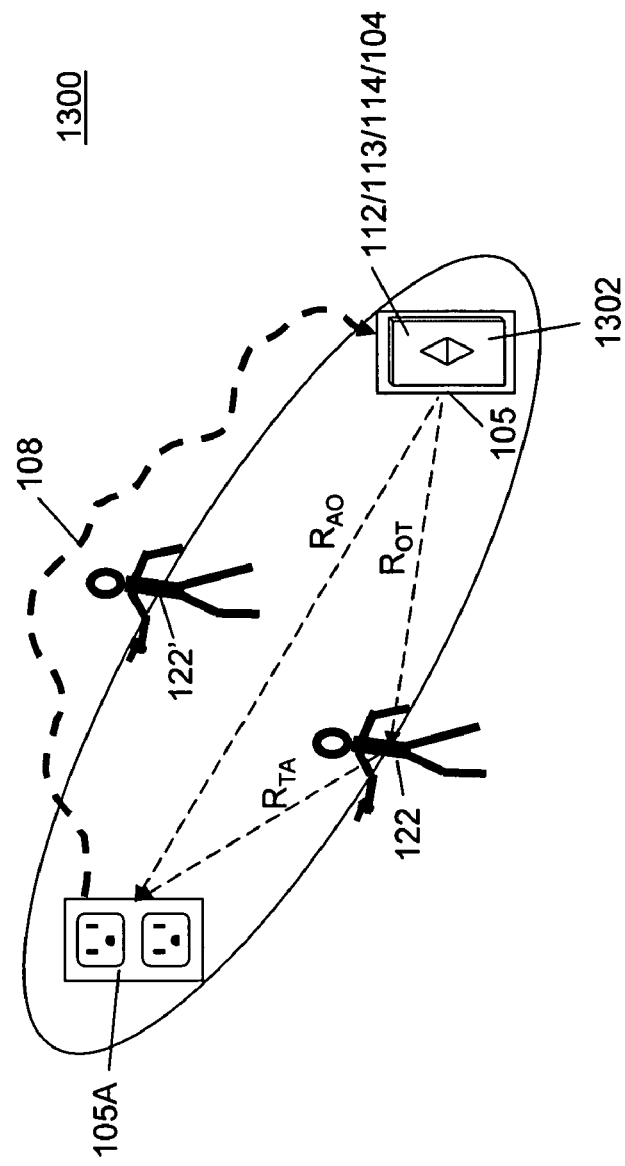
FIG. 13B illustrates the object detection system according to still another embodiment of the present invention using the outlets coupled to a common circuit to detect intrusion.
Figure 14A:
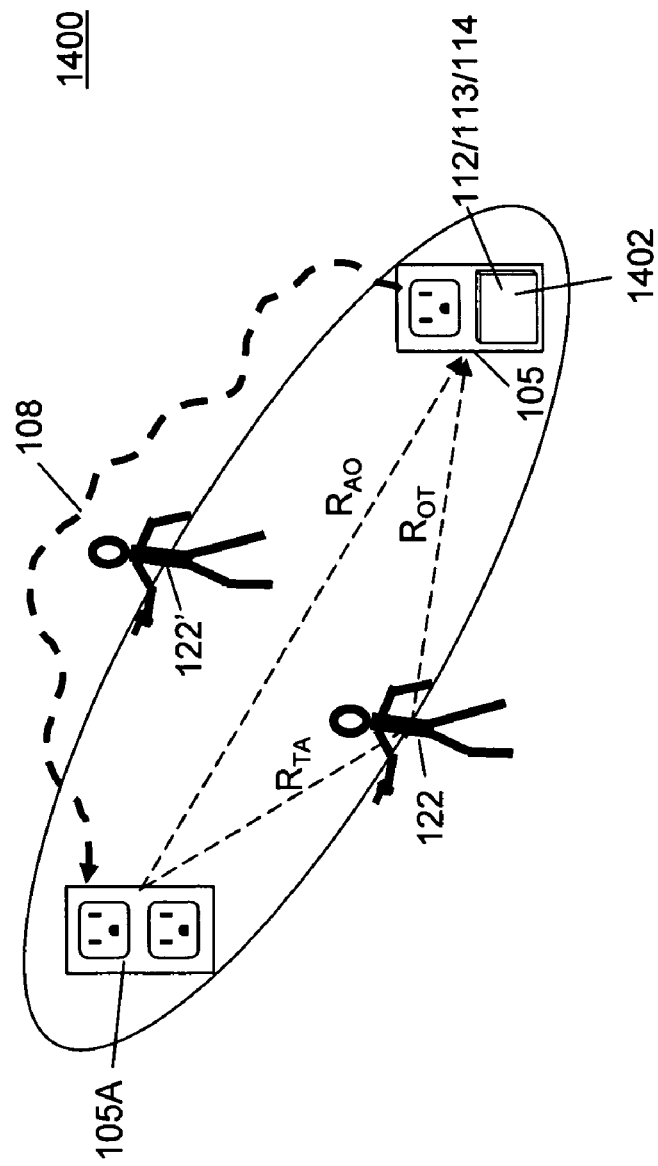
FIG. 14A illustrates the object detection system according to another alternative embodiment of the present invention using the outlets coupled to a common circuit to detect intrusion.
Figure 14B:
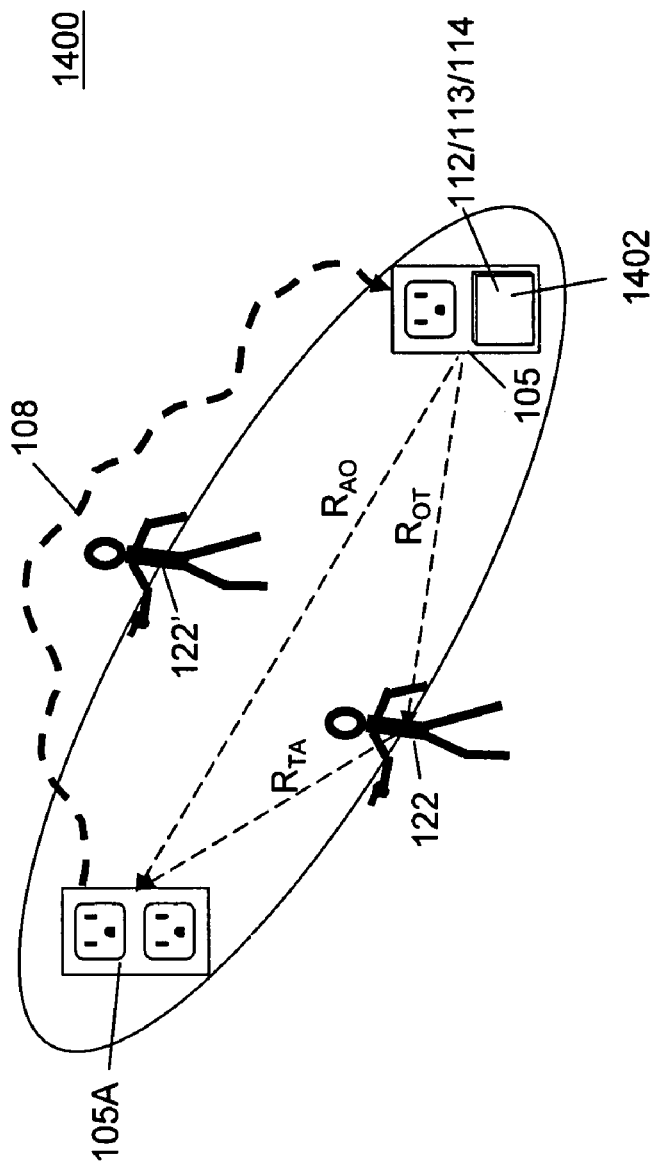
FIG. 14B illustrates the object detection system according to still another alternative embodiment of the present invention using the outlets coupled to a common circuit to detect intrusion.

In a still further embodiment of the invention, the impulse radio 104 of FIGS. 13A and 13B can be omitted. As shown in FIGS. 14A and 14B, an apparatus 1402 that includes the RF waveform generator 112, TDR receiver 113 and processor 114 functioning as a single unit is plugged into the outlet 105. The outlet 105 is coupled via the utility transmission line wiring 108 to one or more other impedance discontinuities, such as other outlets. Under one arrangement depicted in FIG. 14A, the RF waveform generator 112 of the apparatus 1402 generates the RF waveform that propagates down the transmission line wiring 108. A distal impedance discontinuity such as the outlet 105A emits a portion of the RF waveform that is received by the outlet 105 both directly and in directly via target 122, where the outlet 105 is connected directly to the RF waveform generator 112 of the apparatus 1402. Under another arrangement depicted in FIG. 14B, the RF waveform generator 112 of the apparatus 1402 generates the RF waveform that is emitted from the outlet 105 and is received at a distal impedance discontinuity such as the outlet 105A both directly and indirectly via target 122. The received RF waveforms propagate down the transmission line wiring 108 and is received by the TDR receiver 113 of the apparatus 1402. With either arrangement, the outlet 105A and the outlet 105 could act together as a bistatic radar where $t_G$ is equal to $t_E$ (or substantially equal requiring calibration) since the waveform generator is at the outlet 105. Alternatively, the apparatus 1402 of FIG. 14A and FIG. 14B can alternatively be configured such that both the outlet 105 and the outlet 105A operate individually as monostatic radars and/or together as a bistatic radar, as described above.

In one embodiment of the invention, the receiving impulse radios 104A, 104B are each capable of determining the angles of arrival, $\theta_A$, $\theta_B$, of the reflected signals. For example, the impulse radios could employ direction-finding antennas. Given the distance between the impulse radios $R_{AB}$, and the angles of arrival of the received signals, $\theta_A$, $\theta_B$, basic trigonometry can be used to calculate the distance, $R_{OA}$, $R_{OB}$, from the emission point to each of the receiving impulse radios from which the coordinates of the emission point (x, y) can be derived. For example, the two impulse radios 104A and 104B and the outlet 105 shown in FIG. 15 form a triangle 1500 having sides including the distances $R_{OA}$, $R_{OB}$ from the outlet 105 to the two impulse radios and the distance $R_{AB}$ between the impulse radios. A first reference line 1501a that is perpendicular to $R_{AB}$ can be drawn that intersects emission point (x,y), which occurs at the outlet 105. A second reference line 1501b parallel to reference line 1501a can be drawn that intersects impulse radio 104a and a third reference line 1501c can be drawn that intersects impulse radio 104b. Angles $\theta_A$, $\theta_B$ can then be determined relative to reference lines 1501b and 1501c using direction-finding antennas present on the two impulse radios 104A and 104B, respectively. The three angles of the triangle are $90°-\theta_A$ at impulse radio 104A, $90°-\theta_B$ at impulse radio 104B, and $\theta_A+\theta_B$ at the outlet 105. According to the Law of Sines:

$$R_{AB}/\sin(\theta_A+\theta_B)=R_{OA}/\sin(90°-\theta_B)=R_{OB}/\sin(90°-\theta_A) \quad \text{Equation 18}$$

Given $R_{AB}$, $\theta_A$, and $\theta_B$ are known, $R_{OA}$ or $R_{OB}$ can be determined using equations 19 and 20.

$$R_{OA}=R_{AB}\sin(90°-\theta_B)/\sin(\theta_A+\theta_B) \quad \text{Equation 19}$$

$$R_{OB}=R_{AB}\sin(90°-\theta_A)/\sin(\theta_A+\theta_B) \quad \text{Equation 20}$$

Once values are determined for the lengths of the sides of the triangle, $R_{OA}$, $R_{OB}$, the location of the outlet 105 can be determined. Thereafter, the emission time $t_E$ can be determined from either $R_{OA}$ or $R_{OB}$ and the corresponding time of arrival $t_A$ or, $t_B$ using equations 3 and 4 above.

Figure 16A:
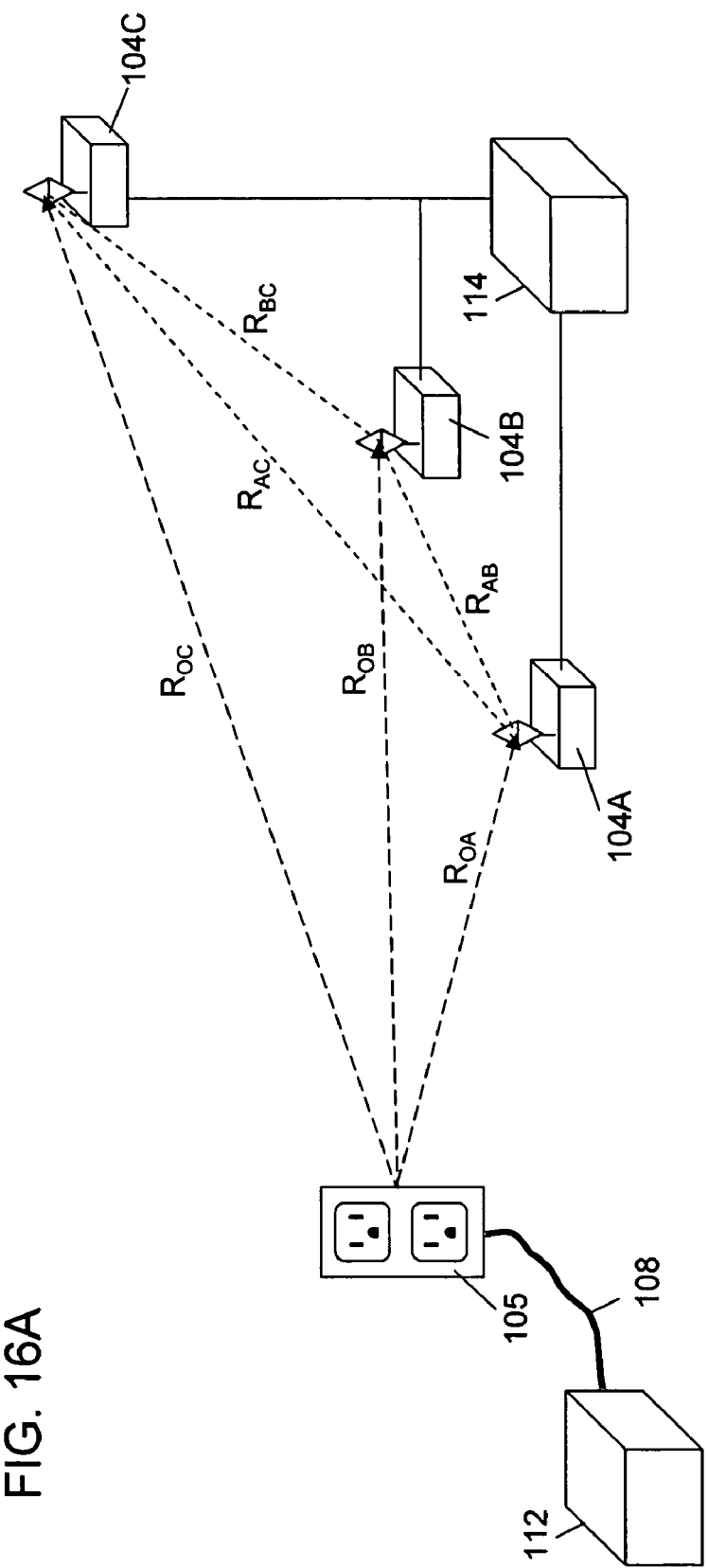
FIG. 16A shows the object detection system according to an embodiment involving time synchronized impulse radios.
Figure 16B:
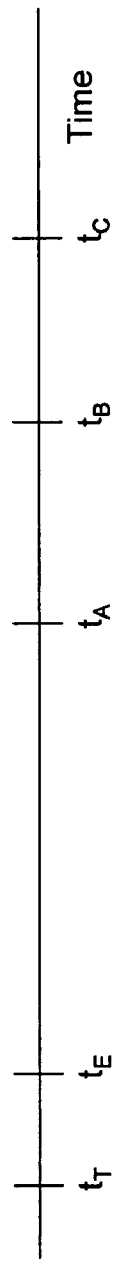
FIG. 16B depicts an exemplary time line that might be used in accordance with the embodiment of FIG. 16A.

According to another embodiment of the invention, differential time of arrival (DTOA) techniques may be used to determine the location of the emission point. Under one arrangement, impulse radios 104A, 104B, 104C have known positions relative to each other and are time synchronized. The impulse radios are interfaced with the processor 114. As can be seen in FIGS. 16A and 16B, the RF waveform generator 112 generates RF waveform at time $t_G$ that propagates down transmission line wiring 108 and is emitted from the outlet 105 at time $t_E$. Impulse radios 104A, 104B, 104C receive the emitted waveforms at times $t_A$, $t_B$, and $t_C$, respectively. The processor 114 can use equations 3 through 7 above and equations 21 through 24 below to solve for coordinate (x,y) of the outlet 105.

$$R_{OC}/c=t_C-t_E \quad \text{Equation 21}$$

$$t_C-t_B=(R_{OC}-R_{OB})/c \quad \text{Equation 22}$$

$$t_C-t_A=(R_{OC}-R_{OA})/c \quad \text{Equation 23}$$

$$R_{OC}=((x-x_C)^2+(y-y_C)^2)^{1/2} \quad \text{Equation 24}$$

Specifically, equations 5, 6, and 7 can be combined to produce:

$$c(t_A-t_B)=((x-x_A)^2+(y-y_A)^2)^{1/2}-((x-x_B)^2+(y-y_B)^2)^{1/2} \quad \text{Equation 25}$$

Equations 19, 22, and 24 can be combined to produce:

$$c(t_C-t_B)=((x-x_C)^2+(y-y_C)^2)^{1/2}-((x-x_B)^2+(y-y_B)^2)^{1/2} \quad \text{Equation 26}$$

Equations 6, 23, and 24 can be combined to produce:

$$c(t_C-t_A)=((x-x_C)^2+(y-y_C)^2)^{1/2}-((x-x_A)^2+(y-y_A)^2)^{1/2} \quad \text{Equation 27}$$

Any two of equations 25, 26, and 27 can be used to solve for x and y. Afterwards, equations 6, 7, and 24 can be used to solve for $R_{OA}$, $R_{OB}$, and $R_{OC}$, respectively, and then any one of equations 3, 4, and 21 can be used to solve for $t_E$.

One skilled in the art will recognize that if impulse radios 104A, 104B, and 104C are synchronized with the RF waveform generator 112 such that $t_G$ is known by the processor 114 (in addition to $t_A$, $t_B$, and $t_C$), then $t_G$ and $t_E$ can be used to approximate the length of the transmission line wiring 108 between the RF waveform generator 112 and the outlet 105. Under one approximation, the speed of signal propagation down the transmission line wiring 108 is 0.6 c (where c is the speed of light) such that the length of the utility transmission line wire, $l_w$, is approximately 0.6 c$(t_E-t_G)$. In a further embodiment of the present invention, TDR techniques may be used to determine the time a signal is emitted, $t_E$, at an discontinuity.

The present invention can be used as an alarm system for a building. As previously described, the present invention can be used to monitor moving targets inside and outside of a building. The processor 114 of the present invention determines the position of an object relative to the building. Should the monitored object move from outside the building to inside, the system sounds an alarm. The alarm could be any type of audible or light emitting device, including a simulated barking dog device, a noise maker, flashing lights, etc. Additionally, the system incorporates a computer network connection to contact the local law enforcement to send assistance.

The present invention can also be used to detect movement within a building environment including building rubble after an earthquake or other event causing the building to collapse. Emergency personnel can employ the invention to use the utility transmission line wiring 108 and associated impedance discontinuities on various circuits to which access can be gained within a pile of rubble to determine the movement of victims within the rubble.

In an alternative embodiment of the present invention that does not involve comparison of RF profiles, the impulse radio attempts to receive a reflected RF waveform a predetermined amount of time after the time of RF waveform transmission, which is the time the RF waveform is emitted at the discontinuity. If a reflected RF waveform signal is successfully received, the predetermined amount of time corresponds to a range to target that lies somewhere on an ellipsoid whose foci are the emission point and the impulse radio. Various methods described herein provide for the time synchronization of the transmission and reception of signals required for this embodiment. One skilled in the art will recognize that time synchronization between the transmission and reception of signals allows a cheaper, single correlator, 'range-gated' receiver architecture as opposed to a scanning receiver type architecture involving multiple correlators.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for radiating radio frequency (RF) waveforms, comprising:
   generating an RF waveform;
   emitting the generated RF waveform from at least one emission point;
   receiving one or more RF reflections of the emitted RF waveform at one or more reception points, wherein at least one of said at least one emission point or said one or more reception points comprises an impedance discontinuity coupled to a utility transmission line that provides a utility service; and
   determining at least one of a temporal and a non-temporal characteristic of the one or more RF reflections.

2. The method of claim 1, further comprising processing at least one of the temporal or the non-temporal characteristic of the one or more RF reflections for at least one of locating a target, determining the speed of a target, tracking the motion of a target, detecting an intrusion, detecting the presence of an object or RF profiling an environment.

3. The method of claim 1, wherein the at least one of the temporal or the non-temporal characteristic of the one or more RF reflections is determined at a first time and a second time and compared to each other.

4. The method of claim 1, further comprising determining an angle of arrival of at least one of the one or more RF reflections.

5. The method of claim 1, further comprising determining a location of the impedance discontinuity.

6. The method of claim 1, wherein the at least one emission point or the one or more reception points are used to form at least one of a bistatic radar or a monostatic radar arrangement.

7. The method of claim 1, wherein the utility service is at least one of a public utility service or a private utility service.

8. The method of claim 1, wherein the utility transmission line is at least one of an electrical wiring, a telephone wiring, a cable wiring, audio/visual wiring, a local area network (LAN) wiring, a private branch exchange (PBX) wiring, a girder, a piping, or a metal duct work.

9. The method of claim 8, wherein the electrical wiring is Romex® wiring.

10. The method of claim 1, wherein the utility transmission line is an efficient conductor for frequencies above 300 MHz.

11. The method of claim 1, wherein the RF waveform is generated by at least one of an RF waveform generator coupled to the utility transmission line or a radio transmitter distal to the utility transmission line.

12. The method of claim 1, wherein the one or more RF reflections are received by at least one of a radio receiver distal to the utility transmission line or a Time Domain Reflectometry (TDR) receiver that is coupled to the utility transmission line.

13. The method of claim 1, wherein the generated RF waveform comprises at least one of an Ultra-wideband (UWB) waveform, a Gaussian pulse waveform, a pulse doublet waveform, a pulse triplet waveform, a pulse quadlet waveform, or a burst of cycles waveform.

14. The method of claim 1, wherein the generated RF waveform is coupled to the utility transmission line using at least one of a Balun, a transformer, or a coupler.

15. The method of claim 1, wherein the impedance discontinuity is at least one of an outlet, a switch, a light bulb, a light fixture, a lamp, a ceiling light, a motor, a control system, or a resistance heating.

16. The method of claim 1, further comprising determining an emission time for when the RF waveform is emitted from the emission point.

17. The method of claim 16, wherein the emission time is determined using a TDR technique.

18. The method of claim 1, further comprising determining one or more reception times for when the one or more RF reflections are received at the one or more reception points.

19. A system for radiating radio frequency (RF) waveforms, comprising:
   a RF waveform generator associated with at least one emission point, said RF waveform generator generating an RF waveform, said generated RF waveform resulting in at least one emitted RF waveform being emitted from the at least one emission point;
   one or more receivers that receive one or more RF reflections of the at least one emitted RF waveform at one or more reception points;
   a utility transmission line that provides a utility service, said utility transmission line having an impedance discontinuity coupled thereto, said impedance discontinuity comprising at least one of said at least one emission point or said one or more reception points; and
   a processor that determines at least one of a temporal or a non-temporal characteristic of the one or more RF reflections.

20. The system of claim 19, wherein the processor determines at least one of the temporal or the non-temporal characteristic of the one or more RF reflections for at least one of locating a target, determining the speed of a target, tracking the motion of a target, detecting an intrusion, detecting the presence of an object or RF profiling an environment.

21. The system of claim 19, wherein the processor determines the at least one of the temporal or the non-temporal characteristic of the one or more RF reflections at a first time and a second time and compares the at least one of the temporal or the non-temporal characteristic of the one or more RF reflections determined at the first time to the at least one of the temporal or the non-temporal characteristic of the one or more RF reflections determined at the second time.

22. The system of claim 19, wherein the processor determines an angle of arrival of at least one of the one or more RF reflections.

23. The system of claim 19, wherein the processor determines a location of the impedance discontinuity.

24. The system of claim 19, wherein the processor determines the at least one of the temporal or the non-temporal characteristic of the one or more RF reflections using the at least one emission point or the one or more reception points to form at least one of a bistatic radar and or a monostatic radar arrangement.

25. The system of claim 19, wherein the utility service comprises at least one of a public utility service or a private utility service.

26. The system of claim 19, wherein the utility transmission line comprises at least one of an electrical wiring, a telephone wiring, a cable wiring, an audio/visual wiring, a local area network (LAN) wiring, a private branch exchange (PBX) wiring, a girder, a piping, or a metal duct work.

27. The system of claim 19, wherein the electrical wiring comprises Romex® wiring.

28. The system of claim 19, wherein the utility transmission line comprises an efficient conductor for frequencies above 300 MHz.

29. The system of claim 19, wherein the RF waveform generator comprises at least one of a generator that is coupled to the utility transmission line or a radio transmitter distal to the utility transmission line.

30. The system of claim 19, wherein the one or more receivers comprise at least one of a Time Domain Reflectometry (TDR) receiver that is coupled to the utility transmission line.

31. The system of claim 19, wherein the generated RF waveform comprises at least one of an Ultra-wideband (UWB) waveform, a Gaussian pulse waveform, a pulse doublet waveform, a pulse triplet waveform, a pulse quadlet waveform or a burst of cycles waveform.

32. The system of claim 19, wherein the generated RF waveform is coupled to the utility transmission line using at least one of a Balun, a transformer, or a coupler.

33. The system of claim 19, wherein the impedance discontinuity comprises at least one of an outlet, a switch, a light bulb, a light fixture, a lamp, a ceiling light, a motor, a control system, or a resistance heating.

34. The system of claim 19, wherein the processor determines an emission time for when the RF waveform is emitted from the emission point.

35. The system of claim 34, wherein the processor determines the emission time using a TDR technique.

36. The system of claim 19, wherein the processor determines one or more reception times for when the one or more RF reflections are received at the one or more reception points.

* * * * *